(12) United States Patent
Wang et al.

(10) Patent No.: US 11,671,956 B2
(45) Date of Patent: Jun. 6, 2023

(54) BEAM MEASUREMENT ON SIDELINK

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Ozcan Ozturk, San Diego, CA (US); Sony Akkarakaran, Poway, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/237,641

(22) Filed: Apr. 22, 2021

(65) Prior Publication Data

US 2022/0346075 A1    Oct. 27, 2022

(51) Int. Cl.
*H04W 76/28* (2018.01)
*H04W 72/044* (2023.01)
*H04W 92/18* (2009.01)

(52) U.S. Cl.
CPC ......... *H04W 72/046* (2013.01); *H04W 76/28* (2018.02); *H04W 92/18* (2013.01)

(58) Field of Classification Search
CPC ... H04W 72/046; H04W 76/28; H04W 92/18; H04W 52/0203; H04W 72/0413
See application file for complete search history.

(56) References Cited

U.S. PATENT DOCUMENTS

2017/0251518 A1   8/2017   Agiwal et al.
2017/0280344 A1   9/2017   Siomina
2017/0331670 A1   11/2017  Parkvall et al.
2018/0255607 A1   9/2018   Nagaraja et al.
2019/0174346 A1   6/2019   Murray et al.
2019/0261287 A1   8/2019   Deenoo et al.
2020/0029386 A1   1/2020   Nam et al.
(Continued)

FOREIGN PATENT DOCUMENTS

WO   WO-2020113246 A1   6/2020

OTHER PUBLICATIONS

Partial International Search Report—PCT/US2022/025629—ISA/EPO—dated Aug. 8, 2022.
(Continued)

*Primary Examiner* — Anez C Ebrahim
(74) *Attorney, Agent, or Firm* — Holland & Hart LLP

(57) ABSTRACT

Methods, systems, and devices for wireless communications are described. Wireless communications systems may support beam measurements triggered by a wake-up signal (WUS) and that triggers an active duration of a receiving user equipment (UE). The WUS may trigger the receiving UE to perform a beam sweeping procedure during a beam measurement occasion that immediately preceding the active duration, or the UE may perform the beam sweeping procedure in the WUS resource itself. A UE may perform beam measurement procedures during active durations of a discontinuous reception (DRX) cycle, or outside of active durations of the DRX cycle. A receiving UE may be configured with a timing for performing a beam measurement procedure based on one or more offset values. The timing offset values may indicate a timing during active durations or prior to active durations.

30 Claims, 20 Drawing Sheets

(56) References Cited

U.S. PATENT DOCUMENTS

2020/0374858 A1* 11/2020 Vargas .................... H04W 4/70
2021/0058866 A1    2/2021 Hosseini et al.
2021/0267009 A1*  8/2021 Van Phan ............. H04W 76/14
2022/0159566 A1*  5/2022 Liu ................. H04W 36/00835

OTHER PUBLICATIONS

Huawei., et al., "Definition of Paging Occasion", 3GPP TSG-RAN WG2 #101, R2-1803644, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 16, 2018, 5 Pages, XP051400667, Sections 1, 2.
International Search Report and Written Opinion—PCT/US2022/025629—ISA/EPO—dated Sep. 30, 2022.

* cited by examiner

BEAM MEASUREMENT ON SIDELINK

FIELD OF TECHNOLOGY

The following relates to wireless communications, including beam measurement on sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support beam measurement on sidelink. Generally, sidelink user equipments (UEs) may communicate with each other on sidelink channels. Sidelink UEs may perform beamforming and beam management procedures, and may also conserve power by entering discontinuous reception (DRX) cycles. However, some conventional systems may not support techniques for performing beam management during DRX cycles. Techniques described herein address timing, triggering, and rules for performing beam management procedures during DRX cycles.

Wireless communications systems may support beam measurements triggered by a wake-up signal (WUS) send by a transmitting sidelink UE that triggers an active duration (e.g., on duration of the DRX cycle) of a receiving sidelink UE. In some examples, the WUS may trigger the receiving sidelink UE to perform a beam sweeping procedure during a beam measurement occasion that immediately preceding the active duration. In other examples, the transmitting and receiving sidelink UEs may perform the beam sweeping procedure in the WUS resource itself. In either scenario, the transmitting and receiving sidelink UEs may select beam pairs based on the beam measurement for communicating during the triggered active duration.

In some examples, a wireless communications system may support beam measurement procedures for sidelink UEs during active (e.g., on) durations of a DRX cycle, or outside of active durations of the DRX cycle. In some examples, a receiving sidelink UE may indicate whether it is capable of performing a beam sweep procedure during beam measurement occasions located outside of its active durations. The transmitting sidelink UE may configure the receiving sidelink UE with a set of beam measurement occasions based on the capability of the receiving UE. In some examples, the beam measurement occasions may be restricted to being located within active durations of the receiving sidelink UE (e.g., or the receiving sidelink UE may ignore or refrain from waking up during beam measurement occasions located outside of its on durations). In some examples, the receiving sidelink UE may support beam measurement during beam measurement occasions located outside of the active durations.

In some examples, a receiving sidelink UE may be configured with a timing for performing a beam measurement procedure based on one or more offset values. The timing for receiving reference signals during a beam sweep procedure may be configured by a set of offset values (e.g., sl-bm-offsetx for each reference signal x). In some examples, the transmitting sidelink UE may transmit an indication of a time duration (e.g., sl-drx-slot-offset) which may define an amount of time prior to an active duration. Each timing offset value (e.g., for the respective reference signals) may be defined with respect to the beginning of the configured time duration. In some examples, the receiving sidelink UE may perform beam measurements during the active duration (e.g., instead of before it).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

A method for wireless communications at a user equipment (UE) is described. The method may include transmitting or receiving control signaling indicating a sidelink beam sweep configuration and a first wake-up signal resource, receiving, during the first wake-up signal resource, a wake-up signal that triggers an active duration of a discontinuous reception cycle, performing a sidelink beam sweep procedure based on the sidelink beam sweep configuration, and communicating, during the active duration using a first receive beam or a first transmit beam selected in the sidelink beam sweep procedure, a data message, a control message, or both.

An apparatus for wireless communications at a UE is described. The apparatus may include a processor, memory coupled with the processor, and instructions stored in the memory. The instructions may be executable by the processor to cause the apparatus to transmit or receive control signaling indicating a sidelink beam sweep configuration and a first wake-up signal resource, receive, during the first wake-up signal resource, a wake-up signal that triggers an active duration of a discontinuous reception cycle, perform a sidelink beam sweep procedure based on the sidelink beam sweep configuration, and communicating, during the active duration used a first receive beam or a first transmit beam selected in the sidelink beam sweep procedure, a data message, a control message, or both.

Another apparatus for wireless communications at a UE is described. The apparatus may include means for transmitting or receiving control signaling indicating a sidelink beam sweep configuration and a first wake-up signal resource, means for receiving, during the first wake-up signal resource, a wake-up signal that triggers an active duration of a discontinuous reception cycle, means for performing a sidelink beam sweep procedure based on the sidelink beam sweep configuration, and means for communicating, during the active duration using a first receive beam or a first transmit beam selected in the sidelink beam sweep procedure, a data message, a control message, or both.

A non-transitory computer-readable medium storing code for wireless communications at a UE is described. The code may include instructions executable by a processor to transmit or receive control signaling indicating a sidelink beam sweep configuration and a first wake-up signal resource, receive, during the first wake-up signal resource, a wake-up signal that triggers an active duration of a discontinuous reception cycle, perform a sidelink beam sweep procedure based on the sidelink beam sweep configuration, and communicating, during the active duration used a first receive beam or a first transmit beam selected in the sidelink beam sweep procedure, a data message, a control message, or both.

In some examples of the method, apparatuses, and non-transitory computer-readable medium described herein, performing the sidelink beam sweep procedure may include operations, features, means, or instructions for performing the sidelink beam sweep procedure during a beam measurement occasion that occurs after the first wake-up signal resource and prior to the active duration.

In some examples of the method, apparatuses, and non-transitory computer-readable medium described herein, receiving the wake-up signal may include operations, features, means, or instructions for receiving the wake-up signal that triggers the UE to perform the sidelink beam sweep procedure during the beam measurement occasion.

Some examples of the method, apparatuses, and non-transitory computer-readable medium described herein may further include operations, features, means, or instructions for receiving a second wake-up signal that triggers a second active duration of the discontinuous reception cycle and communicating, during the second active duration using the first receive beam or the first transmit beam selected in the sidelink beam sweep procedure, a second data message, a second control message, or both.

In some examples of the method, apparatuses, and non-transitory computer-readable medium described herein, performing the sidelink beam sweep procedure may include operations, features, means, or instructions for performing the sidelink beam sweep procedure during a beam measurement occasion that occurs prior to the first wake-up signal resource and prior to the active duration.

In some examples of the method, apparatuses, and non-transitory computer-readable medium described herein, performing the sidelink beam sweep procedure may include operations, features, means, or instructions for performing the sidelink beam sweep procedure during the first wake-up signal resource.

In some examples of the method, apparatuses, and non-transitory computer-readable medium described herein, receiving the wake-up signal may include operations, features, means, or instructions for receiving the wake-up signal that triggers the UE to perform the sidelink beam sweep procedure during the first wake-up signal resource.

Some examples of the method, apparatuses, and non-transitory computer-readable medium described herein may further include operations, features, means, or instructions for transmitting, to a second UE, a beam measurement report indicating the first transmit beam, the first receive beam, or both, where communicating during the active duration using the first receive beam or the first transmit beam that may be selected may be based on the beam measurement report.

Some examples of the method, apparatuses, and non-transitory computer-readable medium described herein may further include operations, features, means, or instructions for transmitting, to a second UE, a beam measurement report indicating a beam measurement based on the sidelink beam sweep procedure, where communicating during the active duration using the first receive beam or the first transmit beam that may be selected may be based on the beam measurement report.

A method for wireless communications at a first UE is described. The method may include transmitting a control message indicating that the first UE is or is not capable of performing a sidelink beam sweep procedure outside of an active duration of a discontinuous reception cycle of the first UE, receiving, based on the control message, control signaling indicating a sidelink beam sweep configuration that identifies a set of multiple beam measurement occasions, performing, during a first beam measurement occasion of the set of multiple beam measurement occasions, the sidelink beam sweep procedure based on the sidelink beam sweep configuration, and transmitting, to a second UE, a beam measurement report indicating at least one transmit beam of a set of multiple transmit beams of the sidelink beam sweep procedure, a beam measurement for the at least one transmit beam, or both.

An apparatus for wireless communications at a first UE is described. The apparatus may include a processor, memory coupled with the processor, and instructions stored in the memory. The instructions may be executable by the processor to cause the apparatus to transmit a control message indicating that the first UE is or is not capable of performing a sidelink beam sweep procedure outside of an active duration of a discontinuous reception cycle of the first UE, receive, based on the control message, control signaling indicating a sidelink beam sweep configuration that identifies a set of multiple beam measurement occasions, perform, during a first beam measurement occasion of the set of multiple beam measurement occasions, the sidelink beam sweep procedure based on the sidelink beam sweep configuration, and transmit, to a second UE, a beam measurement report indicating at least one transmit beam of a set of multiple transmit beams of the sidelink beam sweep procedure, a beam measurement for the at least one transmit beam, or both.

Another apparatus for wireless communications at a first UE is described. The apparatus may include means for transmitting a control message indicating that the first UE is or is not capable of performing a sidelink beam sweep procedure outside of an active duration of a discontinuous reception cycle of the first UE, means for receiving, based on the control message, control signaling indicating a sidelink beam sweep configuration that identifies a set of multiple beam measurement occasions, means for performing, during a first beam measurement occasion of the set of multiple beam measurement occasions, the sidelink beam sweep procedure based on the sidelink beam sweep configuration, and means for transmitting, to a second UE, a beam measurement report indicating at least one transmit beam of a set of multiple transmit beams of the sidelink beam sweep procedure, a beam measurement for the at least one transmit beam, or both.

A non-transitory computer-readable medium storing code for wireless communications at a first UE is described. The code may include instructions executable by a processor to transmit a control message indicating that the first UE is or is not capable of performing a sidelink beam sweep procedure outside of an active duration of a discontinuous reception cycle of the first UE, receive, based on the control message, control signaling indicating a sidelink beam sweep configuration that identifies a set of multiple beam measurement occasions, perform, during a first beam measurement occasion of the set of multiple beam measurement occasions, the sidelink beam sweep procedure based on the sidelink beam sweep configuration, and transmit, to a second UE, a beam measurement report indicating at least one transmit beam of a set of multiple transmit beams of the sidelink beam sweep procedure, a beam measurement for the at least one transmit beam, or both.

In some examples of the method, apparatuses, and non-transitory computer-readable medium described herein, performing the sidelink beam sweep procedure may include operations, features, means, or instructions for performing the sidelink beam sweep procedure during the first beam measurement occasion that occurs within the active duration of the discontinuous reception cycle of the first UE based on the control message indicating that the UE may be not capable of performing the sidelink beam sweep procedure outside of the active duration of the discontinuous reception cycle.

Some examples of the method, apparatuses, and non-transitory computer-readable medium described herein may further include operations, features, means, or instructions for refraining from performing a second sidelink beam sweep procedure during a second beam management occasion that occurs outside of the active duration of the discontinuous reception cycle of the UE based on the control message indicating that the UE may be not capable of performing the sidelink beam sweep procedure outside of the active duration of the discontinuous reception cycle.

In some examples of the method, apparatuses, and non-transitory computer-readable medium described herein, performing the sidelink beam sweep procedure may include operations, features, means, or instructions for performing the sidelink beam sweep procedure during the first beam measurement occasion that occurs outside of the active duration of the discontinuous reception cycle of the UE based on the control message indicating that the UE may be capable of performing the sidelink beam sweep procedure outside of the active duration of the discontinuous reception cycle.

In some examples of the method, apparatuses, and non-transitory computer-readable medium described herein, communicating, during the active duration using the at least one transmit beam of the set of multiple transmit beams selected in the sidelink beam sweep procedure, a data message, a control message, or both.

In some examples of the method, apparatuses, and non-transitory computer-readable medium described herein, receiving the control signaling may include operations, features, means, or instructions for receiving layer one signaling, layer two signaling, or layer three signaling that indicates the sidelink beam sweep configuration.

Some examples of the method, apparatuses, and non-transitory computer-readable medium described herein may further include operations, features, means, or instructions for receiving second control signaling that may be layer one signaling, layer two signaling, or layer three signaling that indicates an updated sidelink beam sweep configuration that identifies a second set of multiple beam measurement occasions.

A method for wireless communications at a first UE is described. The method may include transmitting or receiving a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values, performing the sidelink beam sweep procedure based on the set of multiple timing offset values, and transmitting or receiving a sidelink beam measurement report indicating at least one transmit beam of the set of multiple transmit beams, a beam measurement for the at least one transmit beam, or both, based on the sidelink beam sweep procedure.

An apparatus for wireless communications at a first UE is described. The apparatus may include a processor, memory coupled with the processor, and instructions stored in the memory. The instructions may be executable by the processor to cause the apparatus to transmit or receive a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values, perform the sidelink beam sweep procedure based on the set of multiple timing offset values, and transmit or receive a sidelink beam measurement report indicating at least one transmit beam of the set of multiple transmit beams, a beam measurement for the at least one transmit beam, or both, based on the sidelink beam sweep procedure.

Another apparatus for wireless communications at a first UE is described. The apparatus may include means for transmitting or receiving a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values, means for performing the sidelink beam sweep procedure based on the set of multiple timing offset values, and means for transmitting or receiving a sidelink beam measurement report indicating at least one transmit beam of the set of multiple transmit beams, a beam measurement for the at least one transmit beam, or both, based on the sidelink beam sweep procedure.

A non-transitory computer-readable medium storing code for wireless communications at a first UE is described. The code may include instructions executable by a processor to transmit or receive a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values, perform the sidelink beam sweep procedure based on the set of multiple timing offset values, and transmit or receive a sidelink beam measurement report indicating at least one transmit beam of the set of multiple transmit beams, a beam measurement for the at least one transmit beam, or both, based on the sidelink beam sweep procedure.

In some examples of the method, apparatuses, and non-transitory computer-readable medium described herein, transmitting or receiving the control message may include operations, features, means, or instructions for transmitting or receiving the control message indicating the set of multiple timing offset values that respectively correspond to a set of multiple transmit beam occasions that each occur within the active duration of the discontinuous reception cycle.

In some examples of the method, apparatuses, and non-transitory computer-readable medium described herein, transmitting or receiving the control message may include operations, features, means, or instructions for transmitting or receiving the control message indicating the set of multiple timing offset values that respectively correspond to a set of multiple transmit beam occasions that each occur prior to a beginning of the active duration of the discontinuous reception cycle.

Some examples of the method, apparatuses, and non-transitory computer-readable medium described herein may further include operations, features, means, or instructions for transmitting or receiving an indication of a beam measurement window defining a time period prior to the beginning of the active duration of the discontinuous reception cycle.

Some examples of the method, apparatuses, and non-transitory computer-readable medium described herein may further include operations, features, means, or instructions for performing the sidelink beam sweep procedure within the beam measurement window where each of the set of multiple transmit beam occasions corresponds to a respective timing offset value of the set of multiple timing offset values within the beam measurement window.

Some examples of the method, apparatuses, and non-transitory computer-readable medium described herein may further include operations, features, means, or instructions for receiving the control message or a second control message that triggers the UE to perform the sidelink beam sweep procedure in a resource of a sidelink channel.

Some examples of the method, apparatuses, and non-transitory computer-readable medium described herein may further include operations, features, means, or instructions for communicating, using a transmit beam or a receive beam selected in the sidelink beam sweep procedure, a data message, a control message, or both.

DETAILED DESCRIPTION

Figure 1:
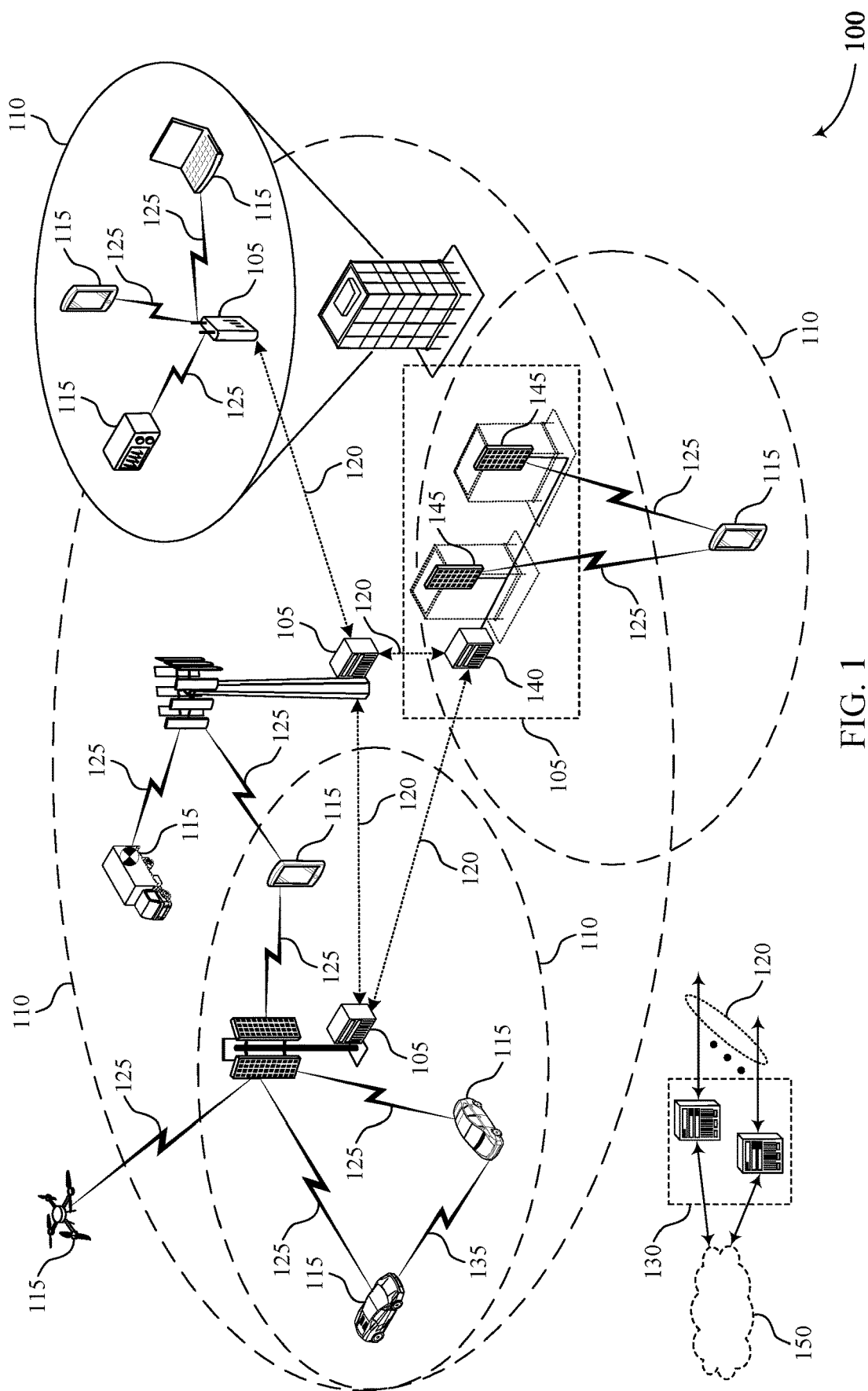
FIG. 1 illustrates an example of a wireless communications system that supports beam measurement on sidelink in accordance with aspects of the present disclosure.

Some wireless communications systems may support sidelink communications. Mobile user equipments (UEs)

may communicate with each other via sidelink channels with or without base station involvement. In some examples such sidelink UEs may enter a discontinuous reception (DRX) mode to conserve power. Sidelink UEs may also communicate on one or more beams, and may rely on beamforming or beam refining procedures to determine beam pairs on which to communicate with other sidelink UEs. Conventional systems may not support techniques for determining when to perform beam measurement and beam sweeping procedures for selecting beams on which to communicate during active or on durations of DRX cycles.

In some examples, wireless communications systems may support beam measurement procedures for sidelink UEs during active (e.g., on) durations of a DRX cycle, or outside of active durations of the DRX cycle. For example, a transmitting UE may broadcast reference beams periodically. Receiving UEs may perform beam measurement on the reference beams. In some examples, the receiving UE may indicate whether it is capable of performing a beam sweep procedure during beam measurement occasions located outside of its active durations. The transmitting UE may configure the receiving UE with a set of beam measurement occasions based on the capability of the receiving UE. In some examples, the beam measurement occasions may be restricted to being located within active durations of the receiving UE (e.g., or the receiving UE may ignore beam measurement occasions or refrain from waking up during beam measurement occasions located outside of its active durations). In some examples, the receiving UE may support beam measurement during beam measurement occasions located outside of the active durations. In such examples, the UE may wake up for the beam measurement occasions, optionally may enter an inactive or sleep mode after the beam measurement occasion, and wake up again to communicate with the transmitting UE during the active durations.

In some examples, wireless communications systems may support beam measurements triggered by a wake-up signal (WUS) sent by a transmitting UE. In some examples, the WUS may trigger an active duration (e.g., on duration of the DRX cycle). Beam measurement may be associated with the activated active duration (e.g., based on one or more rules, or configured with the active duration). If a WUS is received during the WUS resources, then the receiving UE may perform a beam sweeping procedure during the beam measurement occasion immediately preceding the active duration. However, if no WUS is received during the WUS resources, the receiving UE may skip a subsequent beam measurement and active duration (e.g., may not wake up for the next beam measurement and active duration). In some examples, a WUS may independently trigger beam management and active duration. For instance, the WUS may include a trigger for a beam measurement occasion and an active duration of the DRX cycle. In such examples, the UE may perform beam measurements during the next beam measurement occasion and may communicate based on the beam measurements during the next active duration. In some examples, the WUS may include a trigger only or the next active duration (e.g., but no trigger for the next beam measurement occasion). In such examples, the receiving UE may not perform a beam measurement procedure before the next active duration, and may instead communicate during the active duration using previous determined beams.

In some examples, a transmitting UE may transmit a WUS using transmit beams for beam measurements. In such examples, the receiving UE may perform beam measurements during the WUS resources, and the transmitting and receiving UEs may select beam pairs for communicating during a triggered active duration based on the beam measurement. For example, the receiving UE may select which receive beam to use from a set of receive beams swept during the beam sweep procedure, and reports one or more requested transmit beams, one or more transmit beam measurements, or both, that the transmitting UE uses to select which TX beam to use. If no WUS is received during WUS resources, then the receiving UE may determine that no active duration is triggered (e.g., may not wake up during the next active duration).

In some examples, a receiving UE may determine a timing for performing a beam measurement procedure based on one or more timing offset values. For example, each beam measurement procedure may include receiving a set of reference signals sent by the transmitting UE on respective transmit beams. The receiving UE may perform a beam sweep procedure, receiving the reference signals on the respective transmit beams at specific times. The timing for receiving the reference signals may be determined by a set of offset values. The transmitting UE may configure the receiving UE with the offset values. Each timing offset value (e.g., for the respective reference signals) may be defined with respect to the beginning of a configured time duration prior to the active duration. The receiving UE may wake up at each timing offset value (after the beginning of the configured time duration prior to the starting boundary of the active duration) to perform beam measurements for the respective reference signals prior to the active duration. In some examples, the receiving UE may perform beam measurements during the active duration (e.g., instead of before it). In such examples, each of the timing offset values may define an amount of time between the starting boundary of the active duration and a timing for performing beam measurements for one of the transmit beams.

Aspects of the disclosure are initially described in the context of wireless communications systems. Aspects of the disclosure are further illustrated by and described with reference to timelines and process flows. Aspects of the disclosure are further illustrated by and described with reference to apparatus diagrams, system diagrams, and flowcharts that relate to beam measurement on sidelink.

FIG. 1 illustrates an example of a wireless communications system 100 that supports beam measurement on sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support beam measurements triggered by a wake-up signal (WUS) sent by a transmitting UE and that triggers an active duration (e.g., on duration of the DRX cycle) of a receiving UE 115. In some examples, the WUS may trigger the receiving UE 115 to perform a beam sweeping procedure during a beam measurement occasion that immediately preceding the active duration. In other examples, the UE 115 may perform the beam sweeping procedure in the WUS resource itself. In either scenario, the transmitting and receiving UEs 115 may select beam pairs based on the beam measurement for communicating during the triggered active duration.

In some examples, wireless communications systems may support beam measurement procedures for sidelink UEs 115 during active (e.g., on) durations of a DRX cycle, or outside of active durations of the DRX cycle. In some examples, a receiving UE 115 may indicate whether it is capable of performing a beam sweep procedure during beam measurement occasions located outside of its active durations. The transmitting UE may configure the receiving UE 115 with a set of beam measurement occasions based on the capability of the receiving UE 115. In some examples, the beam measurement occasions may be restricted to being located within active durations of the receiving UE 115 (e.g., or the receiving UE 115 may ignore or refrain from waking up during beam measurement occasions located outside of its on durations). In some examples, the receiving UE 115 may support beam measurement during beam measurement occasions located outside of the active durations.

In some examples, a receiving UE 115 may be configured with a timing for performing a beam measurement procedure based on one or more offset values. The timing for receiving reference signals during a beam sweep procedure may be configured by a set of offset values (e.g., sl-bm-offsetx for each reference signal x). In some examples, the transmitting UE 115 may transmit an indication of a time duration (e.g., sl-drx-slot-offset) which may define an amount of time prior to an active duration. Each timing offset value (e.g., for the respective reference signals) may be defined with respect to the beginning of the configured time duration. In some examples, the receiving UE may perform beam measurements during the active duration (e.g., instead of before it).

Figure 2:
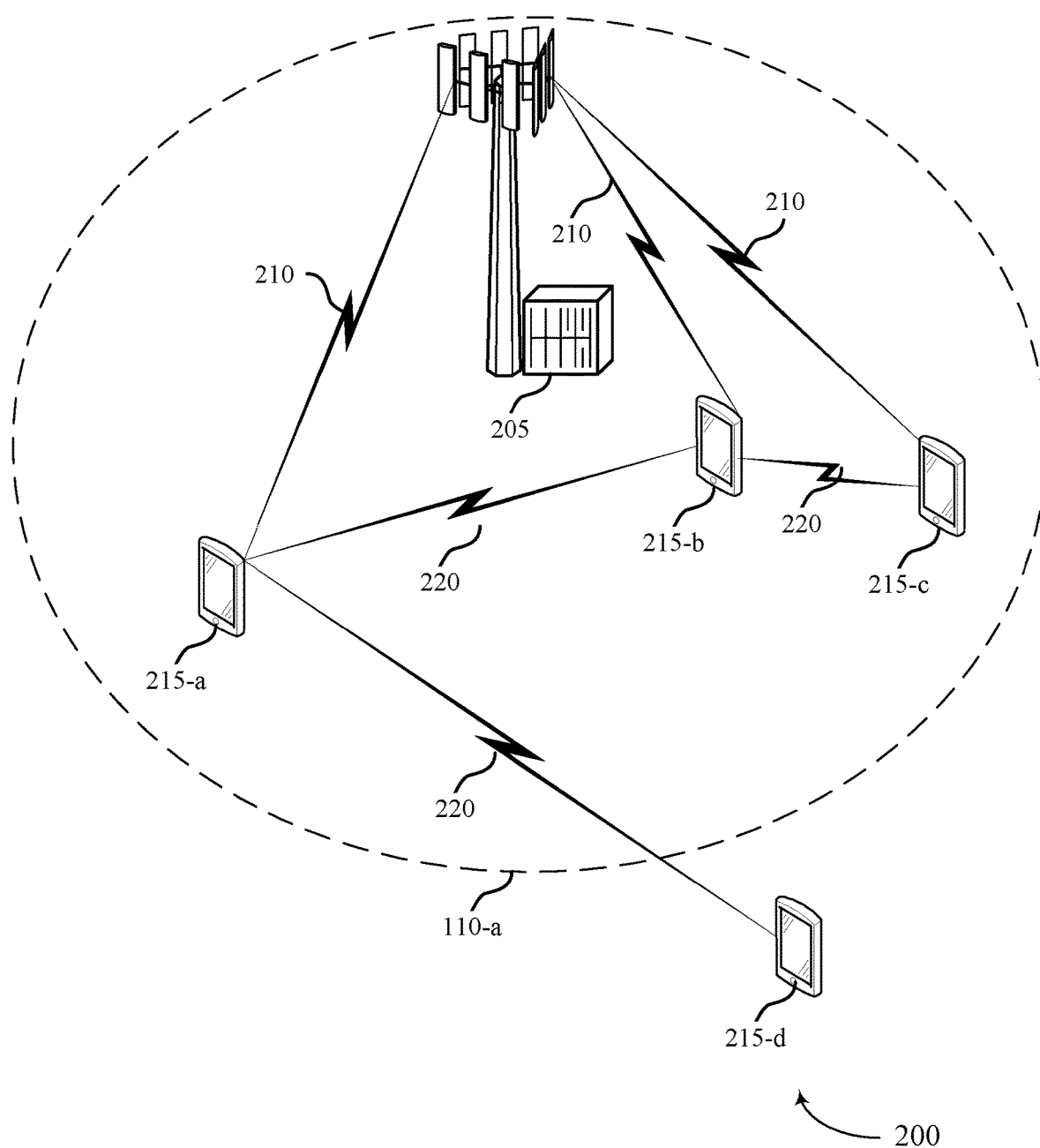
FIG. 2 illustrates an example of a wireless communications system that supports beam measurement on sidelink in accordance with aspects of the present disclosure.

FIG. 2 illustrates an example of a wireless communications system 200 that supports beam measurement on sidelink in accordance with aspects of the present disclosure. Wireless communications system 200 may include one or more communication devices, including a base station 205, a UE 215-*a*, a UE 215-*b*, a UE 215-*c*, and a UE 215-*d*, which may be examples of corresponding devices (e.g., base stations 105 and UEs 115) described with reference to FIG. 1.

Wireless communications system 200 may support communication via multiple communication links. For example, network devices such as base stations 205 may communicate with one or more UEs 215 via Uu links 210. UEs 215 may communicate with each other via sidelinks 220. UEs 215 may perform sidelink communications in a first mode (mode 1) where base station 205 may allocate sidelink resources for communication between UEs 215 on sidelink 220. For instance, base station 205 may allocate sidelink resources to UE 215-*a*. UE 215-*b*, UE 215-*c*, or all UEs 215 located in coverage area 110-*a*. In some examples, UEs 215 may perform sidelink communications in a second mode (mode 2) where the UEs 215 negotiate with each other or allocate sidelink resources to each other without assistance from base station 205. Thus, in some examples, multiple UEs 215 may have direct communication on sidelinks 220 without going through a base station 205. For example, UE 215-*d* may communicate directly with UE 215-*a* on a sidelink 220, without communicating directly with or through base station 205.

In some examples, UEs 215 (e.g., sidelink UEs such as UE 215-*d*) may enable sidelink discontinuous reception (DRX) to save power. In such examples, UEs 215 may enter active states to transmit or receive sidelink communication (e.g., during a time period that may be referred to as an on duration, an active duration, an active mode duration, or the like) and may enter an inactive state, inactive mode, sleep mode, light sleep mode, during other time periods during a DRX cycle. UEs 215 may be configured with, may be preconfigured with, or may select, fixed cycles, active durations, or the like, or may negotiate the DRX cycles with other UEs 215.

In some examples, UEs 215 may perform beam forming to improve or enhance sidelink performance. UEs 215 may perform beam management procedures to support beam forming. Beam management procedures may include beam measurement procedures in sidelink during DRX cycles (e.g., cellular DRX (C-DRX)). Beam measurement procedures may include a transmitting wireless device (e.g., UE 215-*a*) and a receiving wireless device (e.g., UE 215-*d*). Similar procedures, as described herein, may be performed between any transmitting and receiving devices (e.g., between a base station 205 and a UE 215-*a*).

UE 215-*a* may send out one or more reference beams on a sidelink 220. UE 215-*d* may perform beam measurement on received reference beams. UE 215-*a* may transmit one or more reference signals on a set of transmit beams (e.g., different reference signals transmitted on each transmit beam of the set of transmit beams). UE 215-*d* may receive the reference signals on each of a set of receive beams. For example, UE 215-*d* may monitor, as part of a beam sweep procedure, for reference signals using a first receive beam. UE 215-*d* may use the receive beam to receive each reference signal transmitted on each transmit beam of the set of transmit beams, and may perform one or more measurements to determine a signal strength, channel quality, beam quality, or the like, for each of the transmit beams. UE 215-*d* may the monitor, as part of the beam sweep procedure, for each of the reference signals transmitted by UE 215-*a* on the respective transmit beams using a second receive beam, and may similarly perform one or more measurements. UE 215-*a* may repeat this process for each receive beam of a set of receive beams. Having completed the beam sweep procedure, UE 215-*d* may compare measurements to determine best or preferred transmit beam, a best or preferred receive beam, or both. In some examples, UE 215-*d* may transmit a beam measurement report to UE 215-*a*, indicating the transmit beam (e.g., indicating a received reference signal corresponding with the best measurements) for use in subsequent communications.

In some examples, UE 215-*a* may transmit, for beam measurement by one or more UEs 215 (e.g., UE 215-*b* and UE 215-*d*), a common reference beam (e.g., may transmit reference signals on a single, common reference beam or a set of common reference beams). In some examples, UE 215-*a* may transmit UE-specific reference beams on which UEs 215 may perform beam measurement (e.g., may transmit reference signals on a single reference beam or a set of reference beams for UE 215-*d*, and may transmit reference signals on a single reference beam or a set of reference beams for UE 215-*b*). Reference beams may be synchronization signal block (SSB) beams, channel state information (CSI) reference signal (RS) beams, or the like.

Some conventional wireless communications may not support techniques for performing successful beam sweeping procedures during DRX cycles. For example, if rules or procedures are not defined for determining a timing for performing beam measurement with reference to DRX cycles, then one or more devices may not be awake or active to perform beam measurements, resulting in failed beam management, failed communications, increased system latency, increased power expenditures, decreased battery life, and reduced user experience.

Techniques described herein may support coordination between transmitting UEs 215 (e.g., UE 215-*a*) and receiving UEs 215 (e.g., UE 215-*d*) for performing beam measurement procedures during DRX cycles. Such coordination may be implemented by signaling between the transmitting UE 215 and the receiving UE 215 on sidelinks 220 without going through a base station 205 (e.g., without the need for relaying signaling via base station 205). Such coordination may be implemented by configuration from base station 205 via a Uu interface (e.g., via Uu links 210). In some examples, as described in greater detail with reference to FIGS. 3-5 and 12, beam measurements may be performed inside or outside of active durations (e.g., on durations). In some examples, as described in greater detail with reference to FIGS. 6-7 and 13, beam measurements may be performed prior to or during active durations (e.g., on durations) based on one or more timing offset values associated with specific reference signals or reference beams. In some examples, as described in greater detail with reference to FIGS. 8-11, a wake-up signal (WUS) may trigger or activate an active duration (e.g., an on duration), a beam measurement occasion, or both, or beam measurements may be performed during resources allocated for receiving the WUS.

Figure 3:
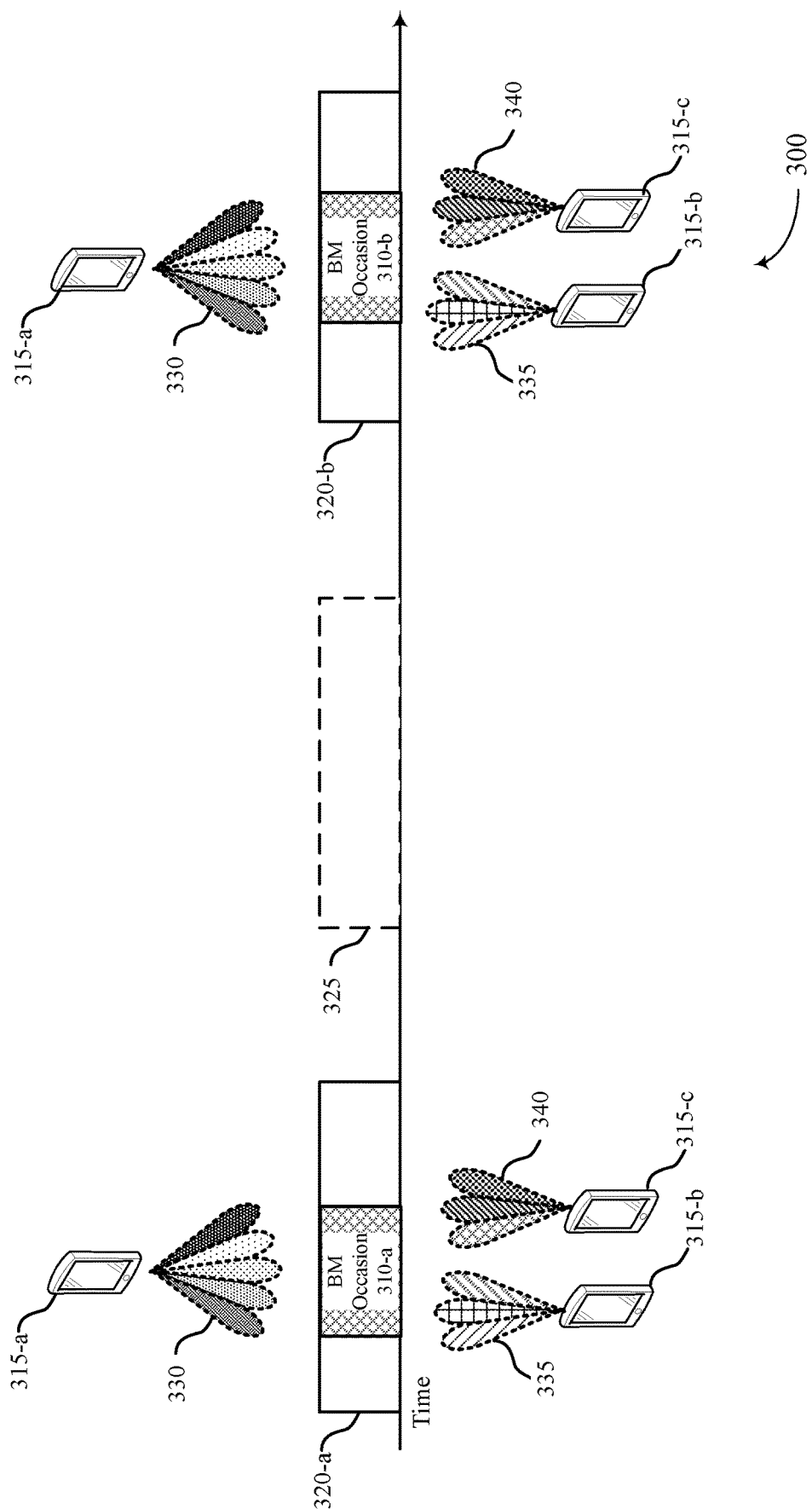
FIG. 3 illustrates an example of a timeline that supports beam measurement on sidelink in accordance with aspects of the present disclosure.

FIG. 3 illustrates an example of a timeline 300 that supports beam measurement on sidelink in accordance with aspects of the present disclosure. Timeline 300 may be implemented by, or may implement aspects of, one or more wireless devices, such as a UE 315-*a*, UE 315-*b*, UE 315-*c*, or base station, which may be examples of corresponding devices described with reference to FIGS. 1-2.

UEs 315 may perform beam measurement during a DRX cycle using common reference beams. A transmitting UE 315 may broadcast reference beams periodically, and receiving UEs 315 may perform beam measurement on reference beams. For example, transmitting UE 315-*a* may transmit reference signals on one or more transmit beams 330 (e.g., common reference beams). This could apply to a group of UEs 315 (e.g., UE 315-*b* and UE 315-*c*). UEs 315 on a sidelink may broadcast SSB beams periodically. In some examples, transmitting UEs 315 (e.g., UE 315-*a*) may send other reference beams periodically. UEs 315 (e.g., UE 315-*b*, UE 315-*c*, etc.) may perform beam measurement procedures (e.g., beam sweep procedures) using receive beams 335 and receive beams 340, respectively.

Beam measurement procedures may be permitted during active durations (e.g., on durations), or outside of active durations, or both (e.g., for different UEs). For instance, UE 315-*a* may transmit reference signals on transmit beams 330 periodically. In some examples, UE 315-*b* may be configured with a set of one or more active durations 320 (e.g., active duration 320-a and active duration 320-b). UE 315-a may broadcast reference beams with a periodicity such that UE 315-b may receive the reference signals using receive beams 335 during a beam measurement occasion 310-a (e.g., which is located within active duration 320-a) and during beam measurement occasion 310-b (e.g., which is located during active duration 320-b). In such examples, UE 315-b may perform beam measurements during (e.g., within) active durations 320.

Other UEs 315 (e.g., UE 315-c) may perform beam measurement outside of active durations. For example, while UE 315-b may be configured with active durations that align with beam measurement occasions, UE 315-c may be configured with active durations 325. UE 315-a may not transmit any reference signals on beams 330 during active duration 325 (e.g., no beam measurement occasions 310 may overlap in time with active duration 325 for UE 315-c). In such examples, UE 315-c may perform beam management during beam measurement occasions 310 (e.g., which are located during active durations 320, and not during active durations 325). Thus, beam measurement may be performed within active duration 320-a (e.g., an on duration for UE 315-b) but outside of active duration 325 (e.g., an on duration for UE 315-c).

Whether a UE 315 is permitted to perform beam measurement outside of its configured active durations may be based on UE capability (e.g., whether a UE 315 is capable of sweeping beams and doing data and control reception). For example, UE 315-b may be capable of performing a beam sweep procedure using receive beams 335 during beam measurement occasion 310-a while simultaneously receiving data signaling, control signaling, or both, during active duration 320-a. However, UE 315-c may not be capable of simultaneously receiving data or control signaling and performing a beam sweep procedure. In such examples, UE 315-c may not perform beam measurements during its own configured active duration. In some examples, if a UE 315 is unable to sweep beams and do data transmission or reception simultaneously, it may not perform beam measurement outside of an active duration. In some examples, UEs 315 may transmit (e.g., broadcast) capability information indicating whether they are capable of performing beam measurement outside of active durations. Capability information may be transmitted to other sidelink UEs 315, base stations, or both. In some examples, UEs 315 may negotiate timing or periodicities of DRX cycles and active durations based on the transmitted capability information. In some examples, base stations may configure DRX cycles, periodicities, or active durations for multiple UEs 315 based on having received capability information from one or more of the multiple UEs 315.

Whether a UE 315 performs beam measurement outside of an active duration may be determined by configuration. For example, UEs 315 may negotiate such configuration. Configuration choices may be updated by L1, L2, or L3 signaling. For instance, one or more UEs 315 may indicate their capability information, and may propose DRX cycles, periodicities or active durations, select (e.g., from values proposed by other UEs 315) subsets of preferred DRX cycles, periodicities, active durations, or the like, or indicate preferred DRX cycles, periodicities, active durations, or the like. In some examples, an initial periodicity of beam measurement occasions (e.g., or an initial rule for whether a UE 315 is permitted to perform beam measurement outside of an active duration) may be established via L1 signaling, and updates or adjustments to the periodicity (e.g., or the initial rule) may be configured via L2 or L3 signaling. In some examples, a base station may set the configuration. A base station may transmit an indication of one or more rules (e.g., indicating whether the UE 315 is permitted to perform beam measurements outside of active durations). The base station may transmit an indication of a DRX periodicity, or may transmit an indication of a location (e.g., in time and frequency resources) of active durations, beam measurement occasions, or both, or any combination thereof.

Examples in which a UE 315 is not permitted to perform beam measurement outside of active durations is described with reference to FIG. 4.

Figure 4:
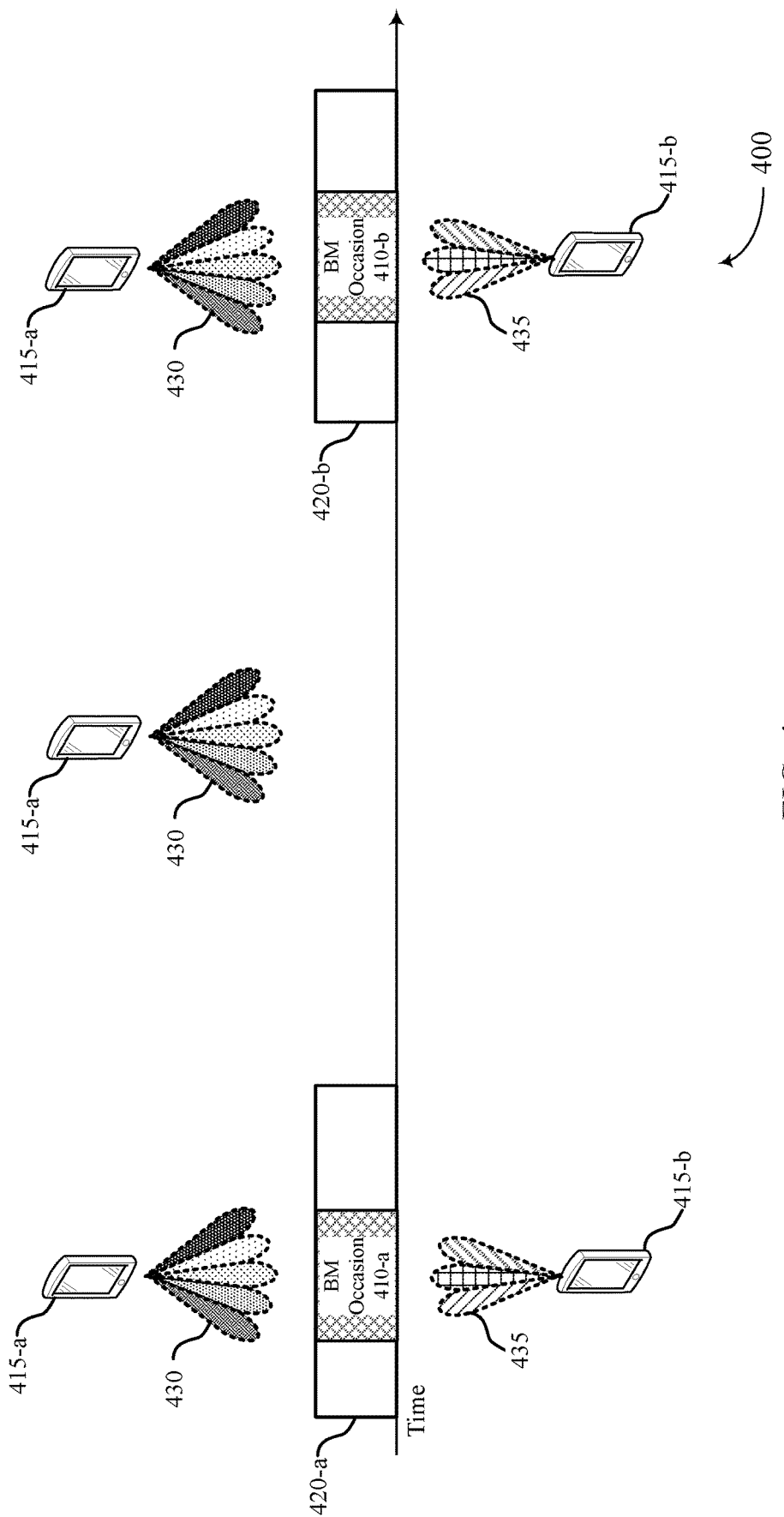
FIG. 4 illustrates an example of a timeline that supports beam measurement on sidelink in accordance with aspects of the present disclosure.

FIG. 4 illustrates an example of a timeline 400 that supports beam measurement on sidelink in accordance with aspects of the present disclosure. Timeline 400 may be implemented by, or may implement aspects of, one or more wireless devices, such as a UE 415-a, UE 415-b, or base station, which may be examples of corresponding devices described with reference to FIGS. 1-3.

In some examples, as described in greater detail with reference to FIG. 3, beam measurement may be restricted to occur within active durations (e.g., on durations) for a receiving UE 415. For instance, UE 415-a may transmit reference signals on transmit beams 430 (e.g., on common beams) for beam measurement by UE 415-b. However, UE 415-b may be restricted to perform beam measurement during its active durations 420-a. Thus, UE 415-b may receive the reference signals by performing a beam sweep procedure using receive beams 435 during beam measurement occasion 410-a, which occurs during active duration 420-a, and may similarly receive the reference signals by performing a beam sweep procedure using receive beams 435 during beam measurement occasion 410-b, which occurs during active duration 420-b. However, UE 415-a may also transmit reference signals on transmit beams 430 after active duration 420-a and before active duration 420-b. UE 415-a may not wake up (e.g., may not enter an active mode) to receive the reference signals transmitted outside of its active durations 420. UE 415-b may determine one or more rules restricting UE 415-b to beam measurement during active durations. The one or more rules may be transmitted by a base station, another UE 415 (e.g., UE 415-a), negotiated between one or more UEs 415 (e.g., via L1, L2, or L3 signaling), or indicated in one or more standards documents. In some examples, the one or more rules for UE 415-b may be based on UE 415-b transmitting capability information indicating that UE 415-b is not capable of performing beam measurement procedures (e.g., beam sweep procedures) outside of active durations 420.

In some examples, restricting beam measurement to active durations for a UE 415 may be beneficial if a DRX cycle is short (e.g., has a short periodicity with short inactive durations). In such examples, a UE 415-b may be able to perform beam measurements often. A UE 415 that has a longer DRX cycle and is restricted to performing beam measurement during active durations may have few opportunities to perform beam measurement. A UE with a longer DRX cycle may be permitted to perform beam measurements outside of active durations (e.g., based on one or more rules, based on configuration information indicated by another UE 415 or a base station, based on negotiation between UEs 415, or the like).

Examples where a UE 415 is permitted to perform beam measurements outside of active durations 420 are described with reference to FIG. 5. Timeline 500 may be implemented by, or may implement aspects of, one or more wireless devices, such as a UE 415-a, UE 415-b, or base station 205, which may be examples of corresponding devices described with reference to FIGS. 1-3.

Figure 5:
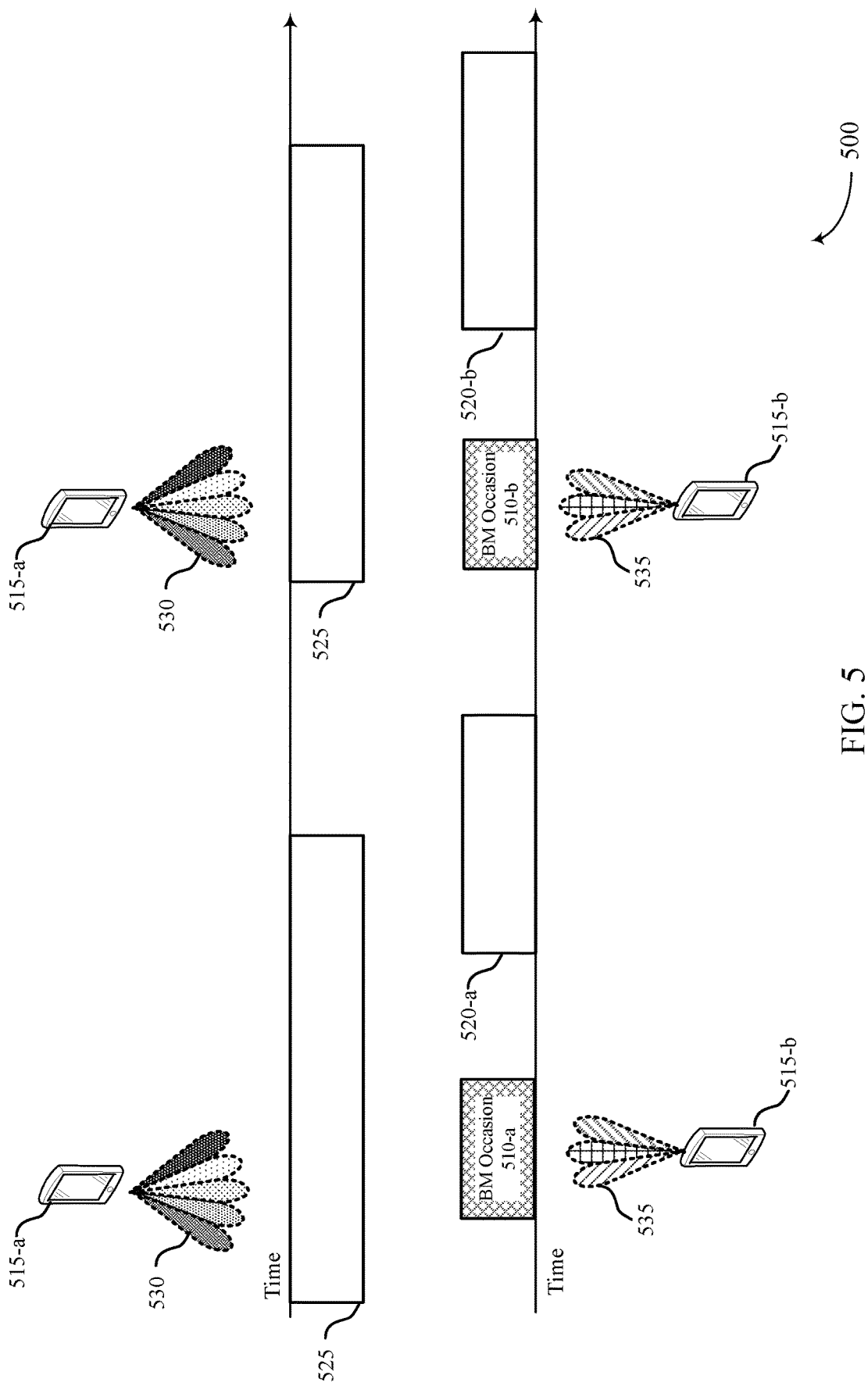
FIG. 5 illustrates an example of a timeline that supports beam measurement on sidelink in accordance with aspects of the present disclosure.

FIG. 5 illustrates an example of a timeline 500 that supports beam measurement on sidelink in accordance with aspects of the present disclosure. Timeline 500 may be implemented by, or may implement aspects of, one or more wireless devices, such as a UE 515-a, UE 515-b, or base station, which may be examples of corresponding devices described with reference to FIGS. 1-4.

In some examples, receiving UEs 515 (e.g., UE 515-b) may be permitted to perform beam measurements outside of active durations 520. For example, a transmitting UE 515 (e.g., UE 515-a) may periodically transmit one or more reference signals on transmit beams 530 (e.g., common reference beams) during active durations 525 for UE 515-a. Beam measurement occasions 510 for one or more UEs 515 (e.g., UE 515-b) may coincide with the timing at which UE 515-a transmits the reference signals. UE 515-b may wake up to perform communications (e.g., to receive signaling from UE 515-a) during one or more active durations 520-a (e.g., on durations) of a DRX cycle. However, beam measurement occasions 510 may not overlap in time with active durations 520 for UE 515-b. In such examples, UE 515-b may be permitted to perform a beam sweep procedure and beam measurements during beam measurement occasions 510 outside of active durations 520. For instance, UE 515-b may wake up (e.g., enter an active mode, exit a sleep mode, etc.) during beam measurement occasion 510-a to receive reference signals transmitted on transmit beams 530 using receive beams 535. UE 515-b may perform a bean sweep procedure using receive beams 535 to receive the reference signals, and may perform beam measurements based thereon. Then, UE 515-b may go back to sleep (e.g., enter an inactive mode) until active duration 520-a. UE 515-b may use a transmit beam 530 and a receive beam 535 determined during the beam measurement occasion 510-a for communication with UE 515-a during active duration 520-a. Similarly, UE 515-b may wake up and perform beam measurements during beam measurement occasion 510-b, and then go back to sleep until active duration 520-b. UE 515-b may then wake up and communicate with UE 515-a during active duration 520-b using a beam pair (e.g., a transmit beam 530 and a receive beam 535) determined during the beam measurement performed during beam measurement occasion 510-b.

In some examples, after or during each beam measurement occasion, UE 515-b may transmit a beam measurement report to UE 515-a. The beam measurement report may include an indication of a preferred reference signal of the reference signals received during the beam sweep procedure (e.g., a reference signal received on a transmit beam 530 corresponding to a set of best measurements such as least interference, highest signal to noise ratio (SNR), best channel quality, or the like). UE 515-a may use the transmit beam 530 indicated in the beam measurement report for communicating with UE 515-a during a next active duration 520 (e.g., or during a current active duration 525 during which UE 515-a receives the beam measurement report).

In some examples, a receiving UE 515-b that is permitted to perform beam measurements outside of its active durations 520 may be able to perform beam measurements often, even in the case where the DRX cycle for UE 515-b is long. UE 515-b may be configured to perform beam measurements outside of its active durations (e.g., on durations) after a certain period of time, and to wake up at the transmission time for the reference beams (e.g., during beam measurement occasions 510-a. For example, UE 515-a, or a base station, may configure (e.g., via L1, L2, or L3 signaling) a time offset between beam measurement occasions 510 and active durations 520. UE 515-b may wake up at the configured timing offset value prior to each active duration 520 to perform beam measurements. Or, the time offset may define an amount of time after each active duration 520, and UE 515-b may wake up at the configured timing offset value after each active duration 520 to perform beam measurements for a next active duration 520.

Techniques described herein may improve efficiency for multiple UEs 515. For example, a single UE 515-a may transmit to multiple receiving UEs 515-b. In such examples, all receiving UEs 515-b may receive common reference beams without extra overhead. This may result in more efficient use of available resources, more efficient power expenditures and extended battery life, more effective communication, etc.

In some examples, a timing or periodicity for transmission of reference beams may be independent of active durations 520 for receive UEs 515-b. In such examples, beam measurements may occur far away (e.g., separated in time) from active durations, which may result in selected beams being out of date (e.g., selected beams may no longer be preferred or best beams for communication during an active duration). In some examples, UEs 515 may negotiate, or a base station may configure, timing or periodicity of active durations or beam measurement occasions or both to increase the likelihood of active durations 520 and beam measurement occasions being within a threshold amount of time from each other.

In some examples, UE 515-b may measure reference beams from multiple transmitting UEs 515. For example, during a first beam measurement occasion 510, UE 515-b may perform beam measurements on reference signals received from a first transmitting UE 515, and during a second beam measurement occasion 510, UE 515-b may perform beam measurements on reference signals received from a second transmitting UE 515. UE 515 may switch to active mode to perform beam measurements, which may result in increased power expenditures to beneficially enhance beam management in cases where there are multiple transmitting UEs 515 (e.g., because UE 515-b may switch to active mode frequently). However, UEs 515 may be restricted to perform beam measurements during active durations (e.g., to conserve power), or beam measured occasions and active durations may be configured to decrease power expenditures. Additionally, despite power expenditures for frequent beam measurements, performing beam measurements for multiple transmitting UEs may result in improved efficiency of communications and increased success of communications (based on regularly and accurately selecting beam pairs for communications during active durations).

In some examples, as described with reference to FIGS. 6-7, a receiving UE 515-b may determine a timing for performing beam measurements based on one or more timing offsets, which may identify timing for performing beam measurements during active durations 520 or outside of active durations 520.

Figure 6:
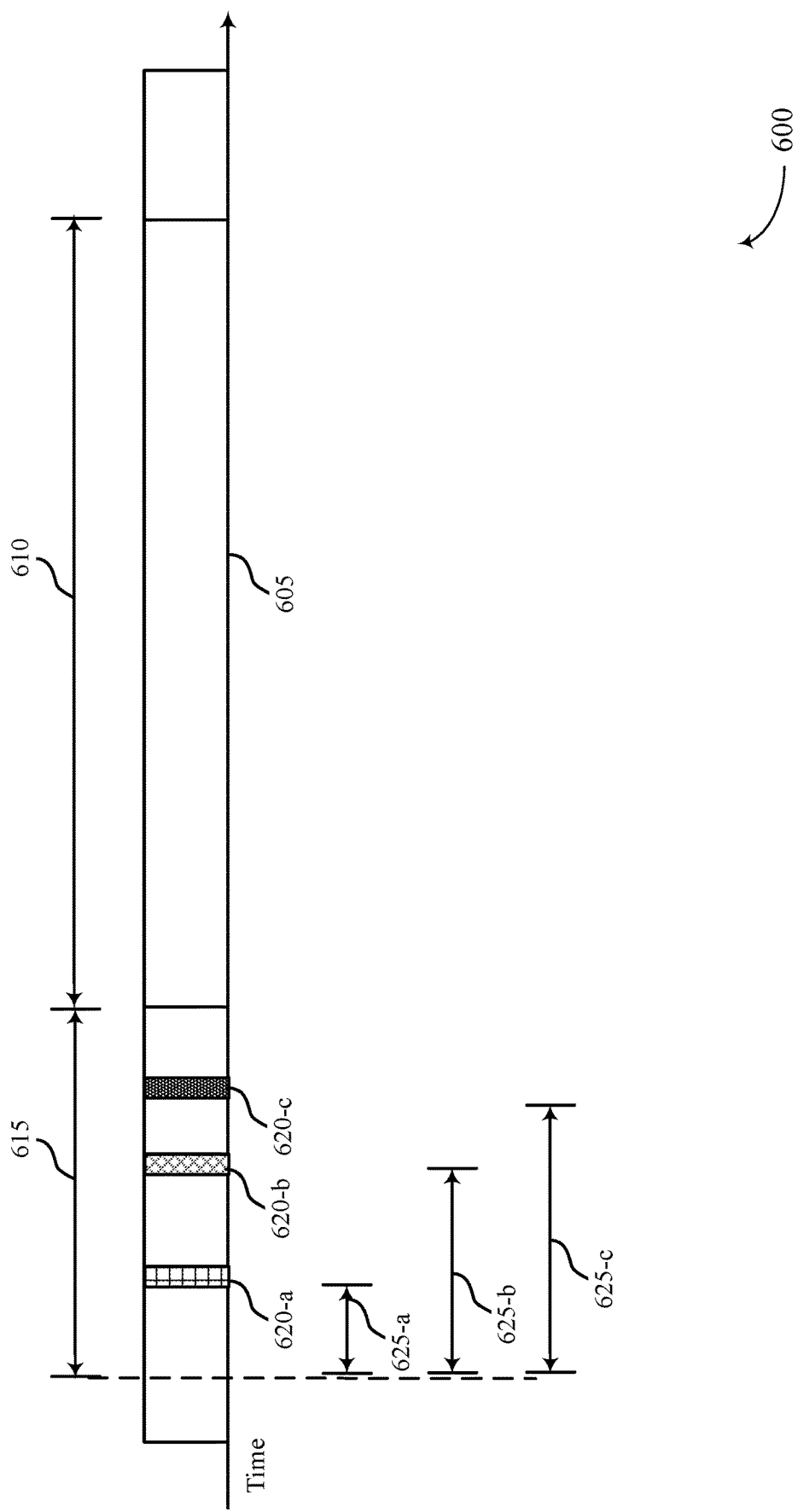
FIG. 6 illustrates an example of a timeline that supports beam measurement on sidelink in accordance with aspects of the present disclosure.

FIG. 6 illustrates an example of a timeline 600 that supports beam measurement on sidelink in accordance with aspects of the present disclosure. Timeline 600 may be implemented by, or may implement aspects of, one or more wireless devices, such as a UE 115, or a base station 105, which may be examples of corresponding devices described with reference to FIGS. 1-5.

A receiving UE 115 (e.g., a receiving UE as described with reference to FIGS. 1-5) may utilize a DRX cycle to conserve power. The UE 115 may enter an active mode during one or more active durations 605 (e.g. and may enter inactive mode outside of the active durations 605). An active duration 605 may be defined by an active duration timer 610 (e.g., a sl-drx-onDurationTimer). To support communications during active durations 605, the receiving UE 115 may perform beam measurement procedures to identify preferred beam pairs (e.g., a transmit beam and a receive beam).

In some examples, a receiving UE 115 may perform beam measurements before an active duration 605. In such examples, the UE 115 may perform beam measurements during a measurement time period 615 (e.g., sl-drx-Slot-Offset). The measurement time period may be a defined amount of time, or may be defined in terms of a timer. The duration of the measurement time period may be configured to be long enough to initiate and complete all necessary beam measurements before expiration of the measurement time period 615 (e.g., all beam measurements finish within sl-drx-Slot-Offset).

The receiving UE 115 may perform beam measurements for one or more reference beams starting after respective timing offset values 625. For example, as part of a beam sweep procedure, a transmitting UE may transmit reference signals on transmit beams, and the receiving UE 115 may receive the reference signals (e.g., associated with specific transmit beams) during one or more time and frequency resources (e.g., beam measurement occasions 620) using a set of receive beams. Each beam measurement occasion 620 may correspond to a particular transmit beam x. The receiving UE 115 may perform beam measurements for each reference beam after a timing offset value 625. In some examples, the timing offset values 625 may be defined from a starting boundary of the measurement time period 615. For example, upon initiating the measurement time period 615, the receiving UE 115 may perform beam measurements on a first beam during beam measurement occasion 620-a. The receiving UE 115 may determine the timing of beam measurement occasion 620-a based on timing offset value 625-a. Similarly, the receiving UE 115 may determine the timing of beam measurement occasion 620-b for a second transmit beam by applying timing offset value 625-b, and may determine the timing of beam measurement occasion 620-c for a third transmit beam by applying timing offset value 625-c. Thus, for each transmit beam x, the receiving UE may perform beam measurements starting after a corresponding timing offset value 625 (e.g., sl-bm-offsetx).

In some examples, UEs 115 may negotiate the value of the measurement time period 615 (e.g., to ensure that the duration is long enough to perform all relevant beam measurements prior to an active duration 605). For example, UEs 115 may exchange control signaling indicating proposed or candidate measurement time periods 615, or selecting previously proposed or candidate measurement time periods 615. In some examples, a transmitting UE 115 may indicate to a receiving UE 115 a measurement time period 615 based on a timing of transmissions on the reference beams, or a timing of the beam measurement occasions 620. In some examples, a receiving UE 115 may indicate to a transmitting UE 115 a minimum amount of time that the receiving UE 115 requests for performing beam measurements prior to the active duration 605. In some examples, UEs 115 may negotiate values for the timing offset values 625. For example, UEs 115 may exchange control signaling indicating proposed or candidate timing offset values 625 (e.g., individual values or sets of values), or selecting previously proposed or candidate timing offset values 625.

In some examples, a receiving UE 115 may determine multiple measurement time periods 615. The receiving UE 115 may have or use multiple sl-bm-Offsets depending on a number of transmitting UEs 115 with which the receiving UE 115 communicates. For example, the receiving UE 115 may perform beam measurements for multiple transmitting UEs 115. In such examples, each transmitting UE 115 may have a measurement time period 615, and the different measurement time periods may be the same, or may be different for each transmitting UE 115.

In some examples, a sidelink transmit/receive pair (e.g., a transmitting UE 115 and a receiving UE 115) may have multiple sidelink beam measurement offsets (e.g., sl-bm-Offsets). In such examples, each timing offset value 625 (e.g., each sl-bm-Offset), or each set of timing offset values (e.g., offset values 625-a, 625-b, 625-c), may be associated with one set of reference beams. For example, the transmitting UE 115 may sweep one or more transmit beams from a first set of reference beams during a first timing offset value 625-a, one or more transmit beams from a second set of reference beams during a second timing offset value 625-b, and one or more transmit beams from a third set of reference beams during a third timing offset value 625-c. Correspondingly, the receiving UE 115 may sweep one or more receive beams from a first set of reference beams during the first timing offset value 625-a, one or more receive beams from a second set of reference beams during the second timing offset value 625-b, and one or more receive beams from a third set of reference beams during the third timing offset value 625-c. The period of each set of reference beams may be an integer or a multiple of a DRX cycle. For example, the UEs 115 may sweep the first set of reference beams during the first beam measurement occasion 620-a every measurement time period 615, may sweep the second set of reference beams during the second beam measurement occasion 620-b every other measurement time period 615, and may sweep the third set of reference beams during the third beam measurement occasion 620-c every third measurement time period 615.

The duration of the measurement time period 615 may be determined so as not to exceed a threshold duration. For example, if the duration of measurement time period 615 is too large, a gap between beam measurement and active durations 605 may be too large. In such examples, beams may change between the beam measurement and the active durations 605, and selected or preferred beams may no longer be the best beams on which to communicate. Thus, the duration of measurement time period 615 may be determined, negotiated between UEs 115, or configured (e.g., by a base station) to have a duration that is long enough to perform all beam measurements before the start of an active duration 605, but not so long as to render beam measurements stale by the time the active duration 605 starts.

In some examples, if timing offset values 625 are too similar (e.g., if beam measurement occasions 620 are too close together), then the receiving UE 115 may have to frequently wake up (e.g., for each beam measurement occasion 620). If the waking up is too close together in time, then the receiving UE 115 may expend a large amount of power (e.g., by entering only a light sleep and then waking up for each beam measurement occasion 620). In some examples, beam measurement occasions 620 may be located (e.g., negotiated or aligned with other windows or beam measurement occasions 620) sufficiently far apart to allow a receiving UE 115 to enter a sleep mode (e.g., not a light sleep mode) for a threshold amount of time between beam measurement occasions 620. This may result in increased power savings for the receiving UE 115.

Techniques described herein relating to performing beam measurement prior to active durations 605 may result in beam measurement procedures being decoupled from active durations 605. This may allow for measurement reporting of beam management prior to active durations or at the beginning of the active durations, resulting in accurate and fast beam selection, and more efficient usage of the active duration 605. Additionally, performing beam measurements outside of active durations 605 may avoid collision of beam measurement and data reception.

In some examples, a receiving UE 115 may perform beam measurement procedures during an active duration 605 using one or more timing offset values, as described in greater detail with reference to FIG. 7.

Figure 7:
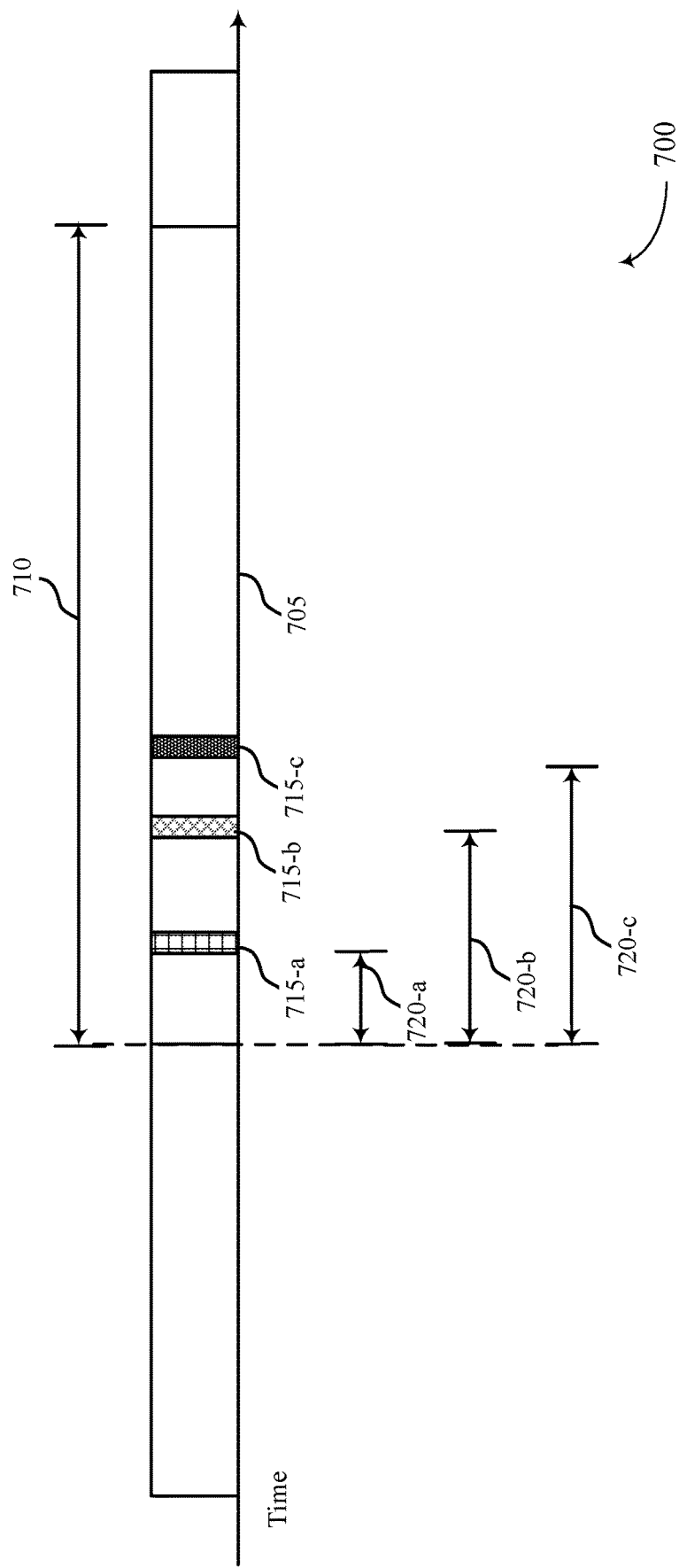
FIG. 7 illustrates an example of a timeline that supports beam measurement on sidelink in accordance with aspects of the present disclosure.

FIG. 7 illustrates an example of a timeline 700 that supports beam measurement on sidelink in accordance with aspects of the present disclosure. Timeline 700 may be implemented by, or may implement aspects of, one or more wireless devices, such as a UE 115, or a base station 105, which may be examples of corresponding devices described with reference to FIGS. 1-6.

A receiving UE 115 may perform beam measurements during an active duration 705. Active duration 705 may be defined by an active duration timer 710 (e.g., sl-drx-onDurationTimer). Beam measurements may be performed within the active duration 705, and may be completed within sl-drx-onDurationTimer. The receiving UE 115 may perform beam measurements for respective transmit beams of a transmitting UE 115 (e.g., for reference beams) starting after one or more respective timing offset values 720. For instance, a transmitting UE 115 may transmit reference signals on transmit beams during one or more beam measurement occasions 715. Each beam measurement occasion 715 may correspond to a transmit beam and a reference signal.

The receiving UE 115 may determine a location of the beam measurement occasions 715 (e.g., may determine a timing for receiving the reference signals) by applying a time value offset 720 (e.g., a sl-onDuration-Offset) with reference to the starting boundary of the active duration 705. During each beam measurement occasion, the receiving UE 115 may perform a beam sweep procedure using a set of receive beams, and may perform beam measurements based thereon. Thus, for each transmit beam x, the receiving UE may perform beam measurements starting after sl-onDuration-Offsetx. The receiving UE 115 may perform beam measurements during beam measurement occasion 715-*a* based on applying timing offset value 720-*a*, may perform beam measurements during beam measurement occasion 715-*b* based on applying timing offset value 720-*b*, and may perform beam measurements during beam measurement occasion 715-*c* based on applying timing offset value 720-*c*. The timing for beam measurement occasions 715 may be defined by the timing offset values 720 with reference to the active duration timer 710 (e.g., based on an association between sl-bm-Offset and sl-onDuration-Offset). Reference beams for use during the beam measurement occasions may be defined by negotiation between UEs 115 or signaling from a base station 105.

In some examples, a transmit/receive pair (e.g., a transmitting UE 115 and a receiving UE 115) may have multiple sidelink beam measurement offset values (e.g., sl-onDuration-Offset). Each sl-onDuration-Offset may be associated with one set of reference beams. The period of each set of reference beams may be an integer or multiple of a DRX cycle. In some examples, each timing offset value 720 (e.g., each sl-bm-Offset), or each set of timing offset values 720 (e.g., offset values 720-*a*, 720-*b*, 720-*c*), may be associated with one set of reference beams. For example, the transmitting UE 115 may sweep one or more transmit beams from a first set of reference beams during a first timing offset value 720-*a*, one or more transmit beams from a second set of reference beams during a second timing offset value 720-*b*, and one or more transmit beams from a third set of reference beams during a third timing offset value 720-*c*. Correspondingly, the receiving UE 115 may sweep one or more receive beams from a first set of reference beams during the first timing offset value 720-*a*, one or more receive beams from a second set of reference beams during the second timing offset value 720-*b*, and one or more receive beams from a third set of reference beams during the third timing offset value 720-*c*. The period of each set of reference beams may be an integer or a multiple of a DRX cycle. For example, the UEs 115 may sweep the first set of reference beams during the first beam measurement occasion 715-*a* every active duration timer 710, may sweep the second set of reference beams during the second beam measurement occasion 715-*b* every other active duration timer 710, and may sweep the third set of reference beams during the third beam measurement occasion 715-*c* every third active duration timer 710.

UEs 115 may negotiate values for the timing offset values 720, or may configure each other with timing offset values 720, or the like (e.g., via L1, L2, or L3 signaling). In some examples, a base station 105 may configure one or more timing offset values 720 for one or more UEs 115.

Using techniques described herein for performing beam measurement during an active duration, a UE 115 may perform measurements without having to wake up and expend additional power outside of an active duration. The receiving UE 115 may not have to be active for longer, and may therefore increase power savings.

In some examples, a transmitting UE may trigger or activate an active duration 705, a beam measurement occasion, or both, in a WUS, as described in greater detail with reference to FIGS. 8-10.

Figure 8:
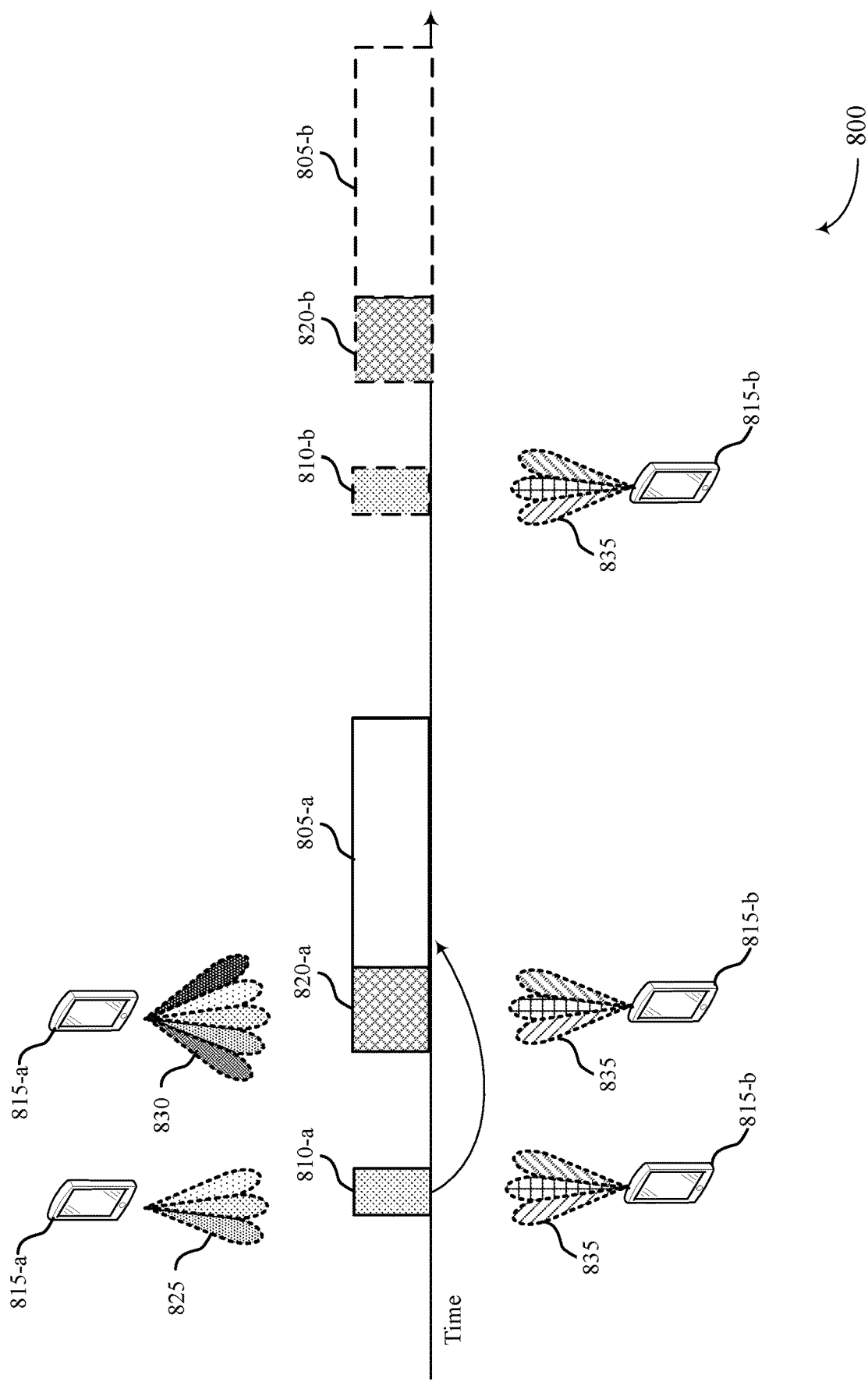
FIG. 8 illustrates an example of a timeline that supports beam measurement on sidelink in accordance with aspects of the present disclosure.

FIG. 8 illustrates an example of a timeline 800 that supports beam measurement on sidelink in accordance with aspects of the present disclosure. Timeline 800 may be implemented by, or may implement aspects of, one or more wireless devices, such as a UE 815-*a*, a UE 815-*b*, or a base station, which may be examples of corresponding devices described with reference to FIGS. 1-7. In some examples, UEs 815 may negotiate allocation of WUS resources 810, beam measurement occasions 820, active durations 805, or any combination thereof. In some examples, a base station 105 may configure one or more UEs 815 with WUS resources 810, beam measurement occasions 820, active durations 805 as part of a DRX cycle, or any combination thereof. WUS resources 810 may be time, frequency, or spatial resources during which a transmitting UE 815 can transmit a WUS to a receiving UE 815, to activate or trigger a next active duration 805.

In some examples, a transmitting UE 815 (e.g., UE 815-*a*) may transmit a WUS to a receiving UE 815 (e.g., 815-*b*) during WUS resources 810. The WUS may indicate a following beam measurement (e.g., may trigger a beam measurement occasion 820 or activate a preconfigured beam measurement occasion 820), or may trigger or activate an active duration 805, or both. WUSs may be transmitted over a subset of transmit beams 825. In some examples, transmit beams 825 used for WUSs and transmit beams 830 used for beam measurement may not be the same. A WUS may indicate a next beam measurement, a subset of reference beams used in the beam measurement, or both. A WUS may indicate a next active duration 805. If UE 815-*b* does not receive a WUS during WUS resources 810, then UE 815-*b* may skip a next beam measurement and a next active duration 805.

In some examples, as described with reference to FIG. 8, a WUS may trigger a UE 115 to wake up for communication during a next active duration 805. For instance, a WUS may trigger a next active duration 805, and beam measurement procedures (e.g., a beam measurement occasion 820) may be associated with activated or triggered active durations 805 (e.g., based on one or more rules). UE 815-*a* may transmit the WUS on one or more transmit beams 825 during WUS resources 810-*a*. UE 815-*b* may monitor for and receive the WUS during WUS resources 810-*a* using one or more receive beams 835. The WUS may include a trigger for a next active duration 805-*a*. The WUS may indicate an active duration 805-*a*, and UE 815-*b* may wake up and perform beam measurements during beam measurement occasion 820-*a* before the triggered active duration 805-*a*. Having performed the beam measurement during beam measurement occasion 820-*a*, UE 815-*b* may stay awake and monitor data or control signaling from UE 815-*a* during active duration 805-*a* (e.g., using a beam pair selected based on the beam measurement). For example, the UE 815-*b* may select a receive beam 835 from a set of receive beams, and may report one or more transmit beams 825 or measurements for the one or more transmit beams 825 for selection of a transmit beam 825 for the data or control signaling.

If UE 815-*b* does not receive a WUS during WUS resources 810, then UE 815-*b* may skip a next beam measurement procedure and active duration 805. For instance, UE 815-*a* may not transmit a WUS during WUS resources 810-*b* (e.g., if UE 815-*a* has no data or control signaling to transmit to UE 815-*b* during active duration 805-*b*). UE 815-*b* may monitor for a WUS during WUS resources 810-*b* using receive beams 835. If no WUS is received during WUS resources 810-*b*, then UE 815-*b* may refrain from performing beam measurements during 820-*b*, and may skip active duration 805-*b* (e.g., may remain asleep instead of waking up and entering an active mode).

In some examples, a WUS may independently trigger beam measurement procedures and active durations, as described in greater detail with reference to FIG. 9.

Figure 9:
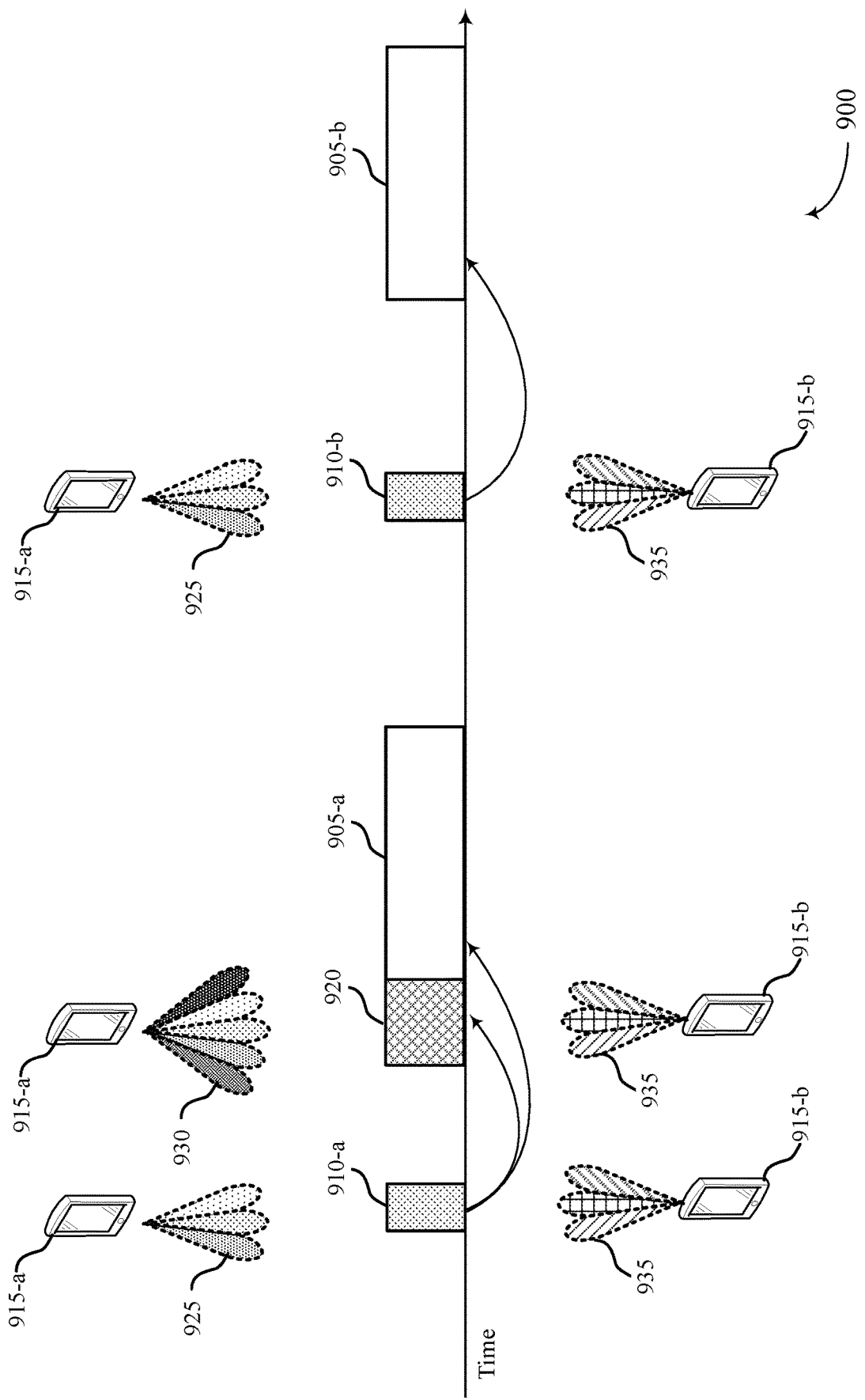
FIG. 9 illustrates an example of a timeline that supports beam measurement on sidelink in accordance with aspects of the present disclosure.

FIG. 9 illustrates an example of a timeline 900 that supports beam measurement on sidelink in accordance with aspects of the present disclosure. Timeline 900 may be implemented by, or may implement aspects of, one or more wireless devices, such as a UE 915-*a*, a UE 915-*b*, or a base station, which may be examples of corresponding devices described with reference to FIGS. 1-8. UEs 915, base stations, or any combination thereof, may configure or otherwise negotiate active durations 905, beam measurement occasions 920, WUS resources 910, or any combination thereof.

WUSs may trigger next active durations and beam measurement independently. In some cases, it may be possible to have an active duration without a corresponding beam measurement. A WUS may independently trigger or activate a beam measurement occasion 920 and a next active duration 905, or may only trigger a next active duration.

In some examples, a WUS may trigger both beam measurement and an active duration 905. UE 915-*b* may monitor WUS resources 910-*a* using receive beams 935 to receive a WUS. UE 915-*a* may transmit the WUS using transmit beams 925 (e.g., which may be different that transmit beams 930 used for beam measurement). The WUS may indicate both beam measurement and an active duration. For instance, the WUS may trigger preconfigured beam measurement occasion 920, or may simply trigger a beam measurement procedure to be performed prior to active duration 905-*a*. The WUS may also trigger active duration 905-*a*. UE 915-*b* may wake up and perform beam measurement before the triggered active duration 905-*a* (e.g., during beam measurement occasion 920). UE 915-*a* may perform the beam measurements by performing a beam sweep procedure using receive beams 935 to receive reference signals transmitted by UE 915-*a* on transmit beams 930. UE 915-*b* may select a preferred transmit beam 930, and may indicate the preferred transmit beam 930 in a beam measurement report. UE 915-*b* may transmit the beam measurement report to UE 915-*a* at the end of beam measurement occasion 920, or during active duration 905-*a*. UE 915-*b* may communicate with UE 915-*a* during active duration 905 using the selected beams based on the beam measurement.

In some examples, a WUS may indicate a next active duration (e.g., but may not trigger beam measurement). For example, UE 915-*a* may transmit a WUS during WUS resources 910-*b*. The WUS may indicate the next active duration 905-*b*, but may not trigger beam measurement. In such examples, UE 915-*b* may skip the next beam measurement (e.g., may not perform beam measurements prior to active duration 905-*b* and after WUS resources 910-*b*). Instead, UE 915-*b* may wake up and monitor active duration 905-*b* for communications from UE 915-*a*. In some examples, UE 915-*b* may communicate during active duration 905-*b* using previously selected beams. For example, UE 915-*b* may use a receive beam 935 selected as a best beam during beam measurements performed during beam measurement occasion 920 to monitor for signaling from UE 915-*a* during active duration 905-*b*. In some examples, UE 915-*a* may select a transmit beam indicated in a previous measurement report (e.g., based on beam measurement occasion 920) to transmit signaling to UE 915-*b* during active duration 905-*b*.

In some examples, a receiving UE may perform beam measurements during WUS resources 910 (e.g., instead of during a separate beam measurement occasion 920), as described in greater detail with reference to FIG. 10.

Figure 10:
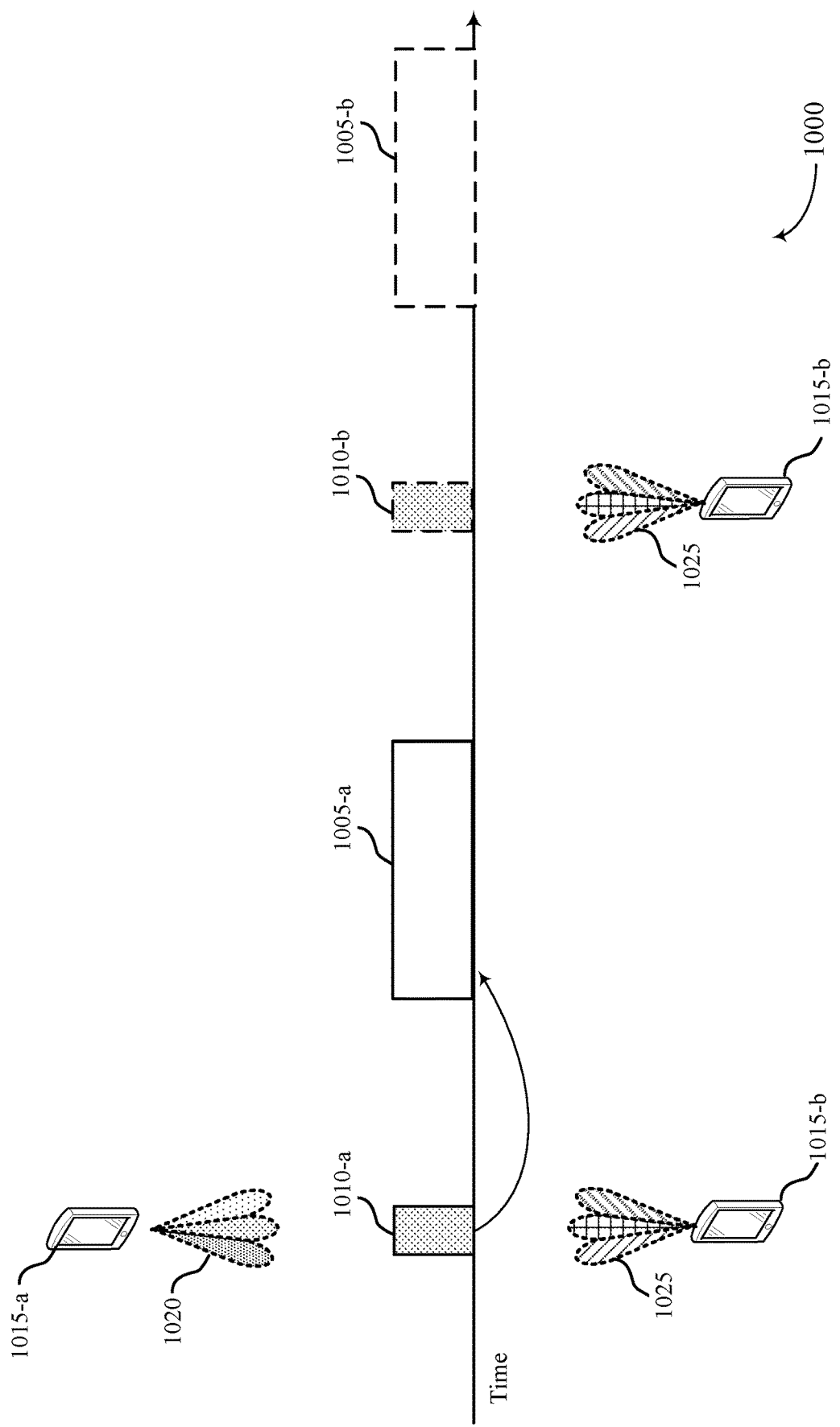
FIG. 10 illustrates an example of a timeline that supports beam measurement on sidelink in accordance with aspects of the present disclosure.

FIG. 10 illustrates an example of a timeline 1000 that supports beam measurement on sidelink in accordance with aspects of the present disclosure. Timeline 1000 may be implemented by, or may implement aspects of, one or more wireless devices, such as a UE 1015-*a*, a UE 1015-*b*, or a base station, which may be examples of corresponding devices described with reference to FIGS. 1-9. UEs 1015, base stations, or any combination thereof, may configure or otherwise negotiate active durations 1005, WUS resources 1010, or any combination thereof.

In some examples, a receiving UE 1015 (e.g., UE 1015-*b*) may perform beam measurements during WUS resources 1010. A transmitting UE 1015 (e.g., UE 1015-*a*) may transmit a WUS to indicate a next active duration 1005 for a receiving UE 1015 (e.g., UE 1015-*b*). UE 1015-*a* may transmit the WUS during WUS resources 1010-*a* using transmit beams 1020. Transmit beams 1020 may be a subset of reference beams. The WUS may indicate (e.g., may trigger or activate) active duration 1005-*a*. UE 1015-*b* may perform beam measurements (e.g., a beam sweep procedure) during WUS resources 1010-*a* using receive beams 1025. UE 1015-*b* may determine a preferred transmit beam 1020 based on performing the beam sweep procedure, and may transmit a beam measurement report to UE 1015-a indicating the preferred transmit beam 1020 (e.g., before active duration 1005-a or during active duration 1005-a). UE 1015-a and UE 1015-b may then communicate during the triggered active duration 1005-a using a beam pair determined based on the beam measurements performed during WUS resources 1010-a.

If UE 1015-b does not receive a WUS during WUS resources 1010-b, then UE 1015-b may skip a next active duration 1005-b. For example, UE 1015-b may monitor for a WUS during WUS resources 1010-b using receive beams 1025. If UE 1015-a does not transmit a WUS during WUS resources 1010-b, then UE 1015-b may skip active duration 1005-b. In such examples, instead of waking up and entering an active mode during active duration 1005-b, UE 1015-b may remain asleep, conserving additional power.

Figure 11:
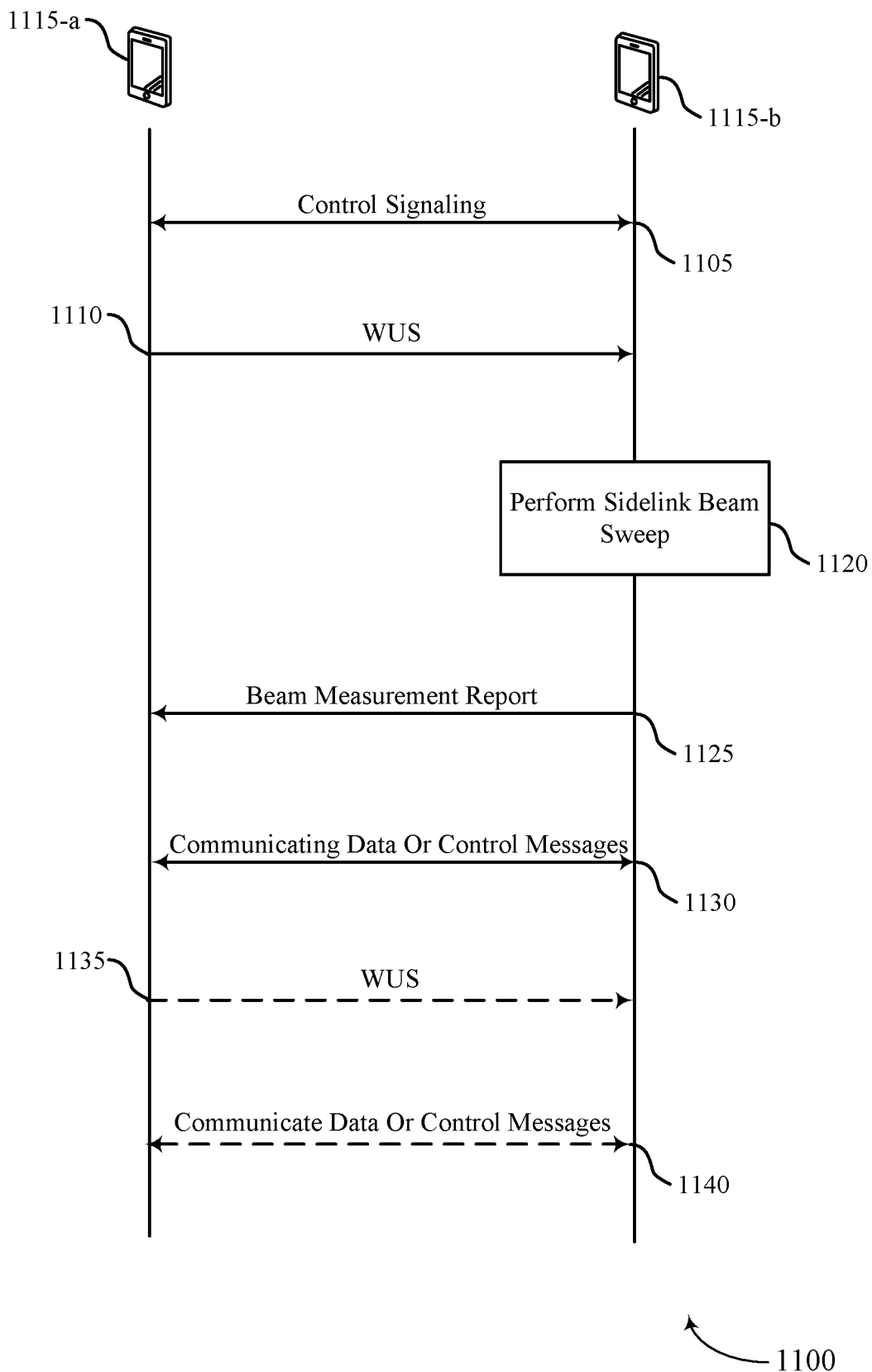
FIG. 11 illustrates an example of a process flow that supports beam measurement on sidelink in accordance with aspects of the present disclosure.

FIG. 11 illustrates an example of a process flow 1100 that supports beam measurement on sidelink in accordance with aspects of the present disclosure. Process flow 1100 may be implemented by or may implement aspects of one or more wireless devices, such as a UE 1115-a and a UE 1115-b, which may be examples of corresponding devices described with reference to FIGS. 1-10.

At 1105, UE 1115-a and UE 115-b may exchange control signaling indicating a sidelink beam sweep configuration and a first wake-up signal resource. For example, UE 1115-a may transmit a control signal to UE 115-b, UE 115-b may transmit a control signal to UE 1115-a, or both. In some examples, UE 115-b may receive control signaling from another wireless device (e.g., a base station) indicating the sidelink beam sweep configuration. In some examples, the sidelink beam sweep configuration may include configuration information instructing UE 1115-b to perform beam measurements using a set of receive beams during one or more beam measurement occasions, or prior to an active duration, or the like. The sidelink beam sweep configuration may include DRX cycle information, including one or more active durations (e.g., on durations).

At 1110, UE 1115-a may transmit, and UE 1115-b may receive, a WUS during the first WUS resources indicated in the control signaling at 1105. The WUS may trigger an active duration of the DRX cycle.

At 1120, UE 1115-b may perform a sidelink beam sweep procedure based on the sidelink beam sweep configuration. The beam sweep procedure may include sweeping through one or more receive beams while receiving reference signals from UE 1115-a transmitted on a set of transmit beams.

In some examples, UE 1115-b may perform the sidelink beam sweep procedure during a beam measurement occasion that occurs after the WUS resources and prior to the active duration. In some examples, the WUS may not trigger the beam measurement, but UE 1115-b may determine (e.g., according to one or more rules) that beam measurement is to occur prior to each triggered active duration. In some examples, the WUS may trigger UE 1115-b to perform the sidelink beam sweep procedure during a triggered beam measurement occasion prior to the active duration.

In some examples, UE 115-b may perform the sidelink beam sweep procedure during the first WUS resources. In such examples, the WUS may trigger UE 1115-b to perform the sidelink beam sweep procedure during the first WUS resource.

At 1125, UE 115-b may transmit, and UE 115-a may receive, a beam measurement report.

At 1130, UE 1115-b may communicate, during the active duration triggered by the WUS, with UE 1115-a. In some examples, UE 1115-b may communicate using a transmit beam, a receive beam, or both, indicated in the beam measurement report. Communications during the active duration may include control signaling, data signaling, or both. In some examples, the communicating may include monitoring for and receiving sidelink communications from UE 1115-a.

At 1135, UE 1115-a may transmit, and UE 1115-b may receive, a second WUS. The second WUS may trigger a second active duration of the DRX cycle (e.g., by may not trigger a second beam sweep procedure). At 1140, UE 1115-b may communicate with UE 1115-a during the second active duration using the transmit beam, receive beam, or both determined at 1120.

Figure 12:
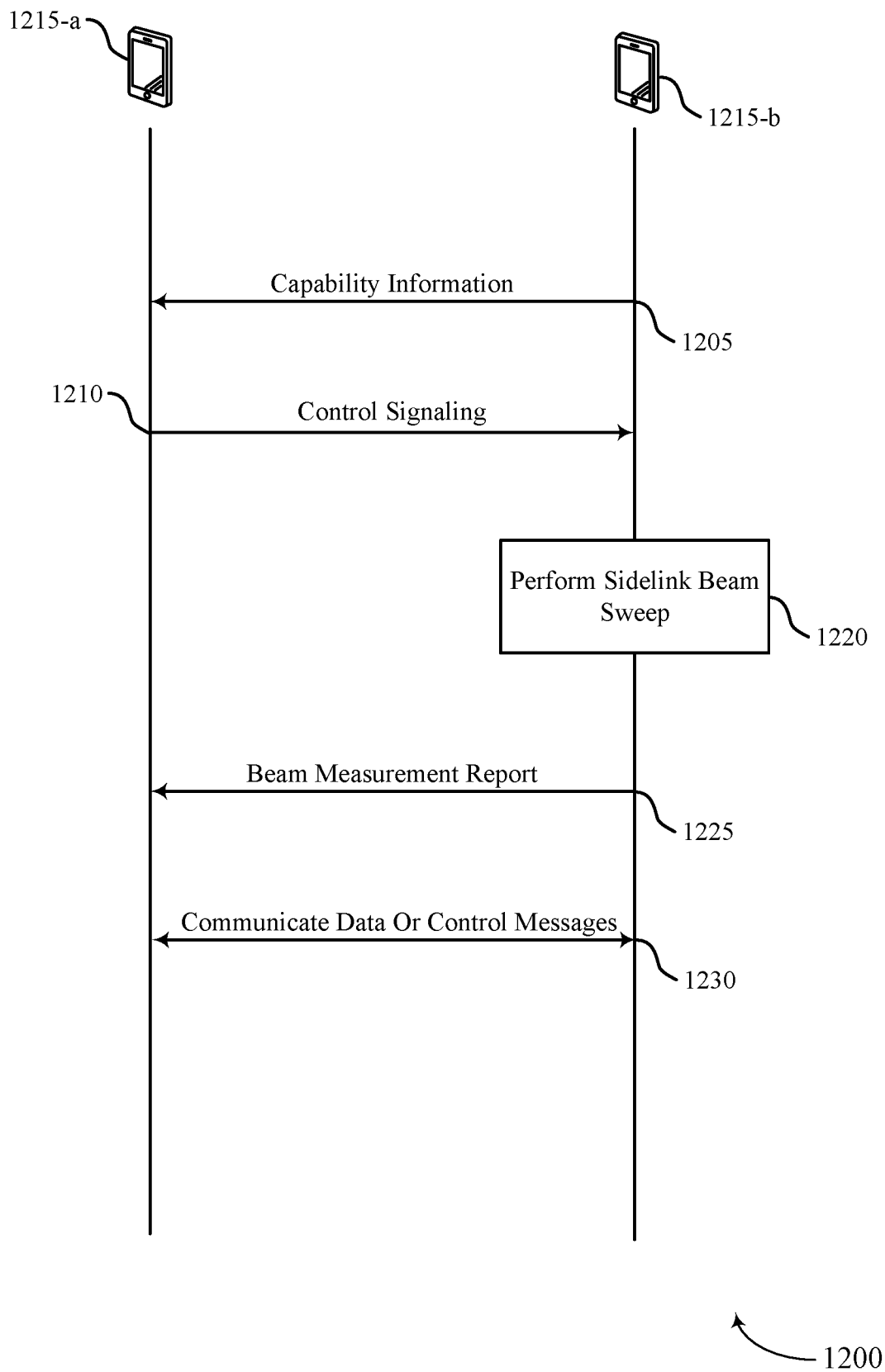
FIG. 12 illustrates an example of a process flow that supports beam measurement on sidelink in accordance with aspects of the present disclosure.

FIG. 12 illustrates an example of a process flow 1200 that supports beam measurement on sidelink in accordance with aspects of the present disclosure. Process flow 1200 may be implemented by or may implement aspects of one or more wireless devices, such as a UE 1215-a and a UE 1215-b, which may be examples of corresponding devices described with reference to FIGS. 1-11.

At 1205, UE 1215-b may transmit, and UE 1215-a may receive, capability information. The capability information may indicate that the first UE is or is not capable of performing a sidelink beam sweep procedure outside of an active duration of a DRX cycle of UE 1215-b.

At 1210, UE 1215-a may transmit, and UE 1215-b receive, control signaling indicating a sidelink beam sweep configuration that identifies a plurality of beam measurement occasions. The control signaling may be L1 signaling, L2 signaling, Le signaling, or any combination thereof. In some examples, UE 1215-b may receive second control signaling that is L1 signaling, L2 signaling, or L3 signaling. The second control signaling may indicate an updated sidelink beam sweep configuration that identifies a second plurality of beam measurement occasions.

At 1220, UE 1215-b may perform a sidelink beam sweep procedure. UE 1215-b may perform the sidelink beam sweep procedure during a first beam measurement occasion of multiple beam measurement occasions (e.g., where the multiple beam measurement occasions are negotiated with other UEs 1215 or configured by a base station). UE 1215-b may perform the beam sweep procedure based on the sidelink beam sweep configuration indicated at 1210.

In some examples, UE 1215-b may perform the sidelink beam sweep procedure during a first beam measurement occasion that occurs within the active duration of the DRX cycle based on the capability information (e.g., control signal transmitted at 1205) indicating that UE 1215-b is not capable of performing the sidelink beam sweep procedure outside of the active duration of the DRX cycle. IN such examples, UE 1215-b may refrain from performing a second sidelink beam sweep procedure during a second beam measurement occasion that occurs outside of the active duration of the discontinuous reception cycle based at least in part on the capability information (e.g., the control message transmitted at 1205) indicating that UE 1215-b is not capable of performing the sidelink beam sweep procedure outside of the active duration of the DRX cycle.

In some examples, UE 1215-b may perform the sidelink beam sweep procedure during the first beam measurement occasion that occurs outside of the active duration of the DRX cycle based at least in part on the capability information (e.g., the control message transmitted at 1205) indicating that UE 1215-b is capable of performing the sidelink beam sweep procedure outside of the active duration of the DRX cycle.

At 1225, UE **1215-*b* may transmit, and UE 1215-*a* may receive, a beam measurement report. The beam measurement report may indicate at least one transmit beam of a set of transmit beams used by UE 1215-*a*** to transmit reference signals during the sidelink beam sweep procedure, or a beam measurement for the transmit beam of the set of transmit beams, or both.

At 1230, UE **1215-*b* and UE 1215-*a* may communicate data or control messages using a transmit beam, a receive beam, or both, indicated in the beam measurement report at 1220. In some examples, UE 1215-*b* may communicate with UE 1215-*b*** during a next active duration after performing the beam sweep procedure.

Figure 13:
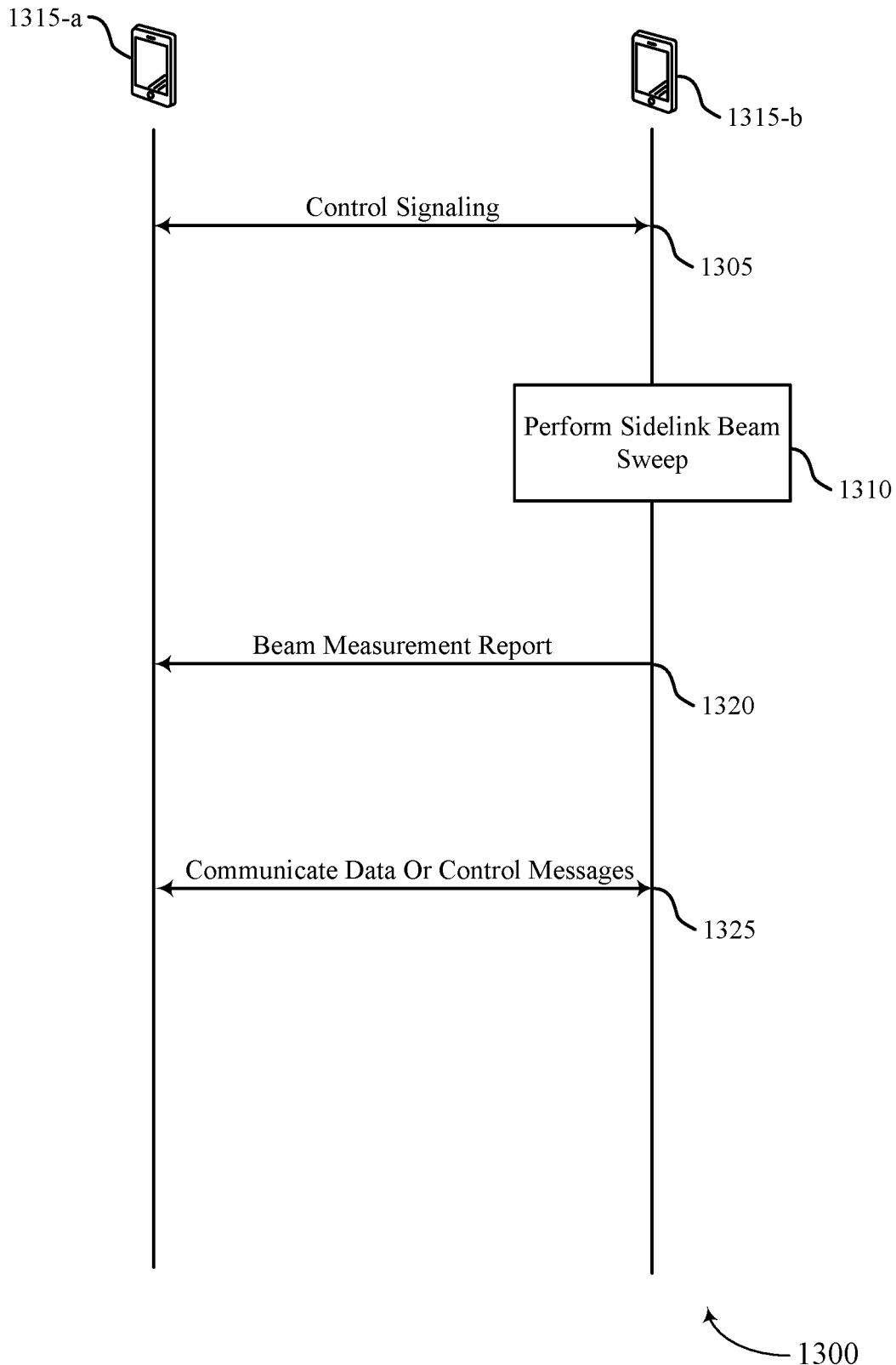
FIG. 13 illustrates an example of a process flow that supports beam measurement on sidelink in accordance with aspects of the present disclosure.

FIG. 13 illustrates an example of a process flow 1300 that supports beam measurement on sidelink in accordance with aspects of the present disclosure. Process flow 1300 may be implemented by or may implement aspects of one or more wireless devices, such as a UE **1315-*a* and a UE 1315-*b*, which may be examples of corresponding devices described with reference to FIGS. 1-12**.

At 1305, UE **1315-*a* and UE 1315-*b* may exchange control signaling. For example, UE 1315-*b* may transmit or receive a control message. The control message may indicate multiple timing offset values associated with an active duration of a DRX cycle. The control message may indicate that a respective transmit beam of a set of transmit beams of a sidelink beam sweep procedure is associated with a respective timing offset value. In some examples, the multiple timing offset values may respectively correspond to transmit beam occasions that each occur within the active duration of the DRX cycle. In some examples, the multiple timing offset values may respectively correspond to transmit beam occasions that each occur prior to a beginning of the active duration of the DRX cycle. In some examples, UE 1315-*a* may transmit or receive an indication of a beam measurement window defining a time period prior to the beginning of the active duration of the DRX cycle. Each of the transmit beam occasions may correspond to a respective timing offset value within the beam measurement window. The control signaling indicating the beam measurement window may be the same control message that configures the sidelink beam sweep procedure, or a different control message. In some examples, UE 1315-*b* may receive (e.g., in the same control message that configures the sidelink beam sweep procedure or a different control message) control signaling that triggers UE 1315-*b*** to perform the sidelink beam sweep procedure in a resource of the sidelink channel.

At 1310, UE **1315-*b* may perform a sidelink beam sweep procedure. UE 1315-*b*** may perform the sidelink beam sweep procedure based at least in part on the timing offset values.

At 1320, UE **1315-*b* may transmit, and UE 1315-*a* may receive, a beam measurement report. The beam measurement report may indicate at least one transmit beam of the set of transmit beams, a beam measurement for the at least one transmit beam, or both, based on performing the sidelink beam sweep procedure at 1310**.

At 1325, UE **1315-*b* and UE 1315-*a* may communicate data or control messages. UE 1315-*b* and UE 1315-*a*** may communicate using a transmit beam or a receive beam or both selected during the sidelink beam sweep procedure.

Figure 14:
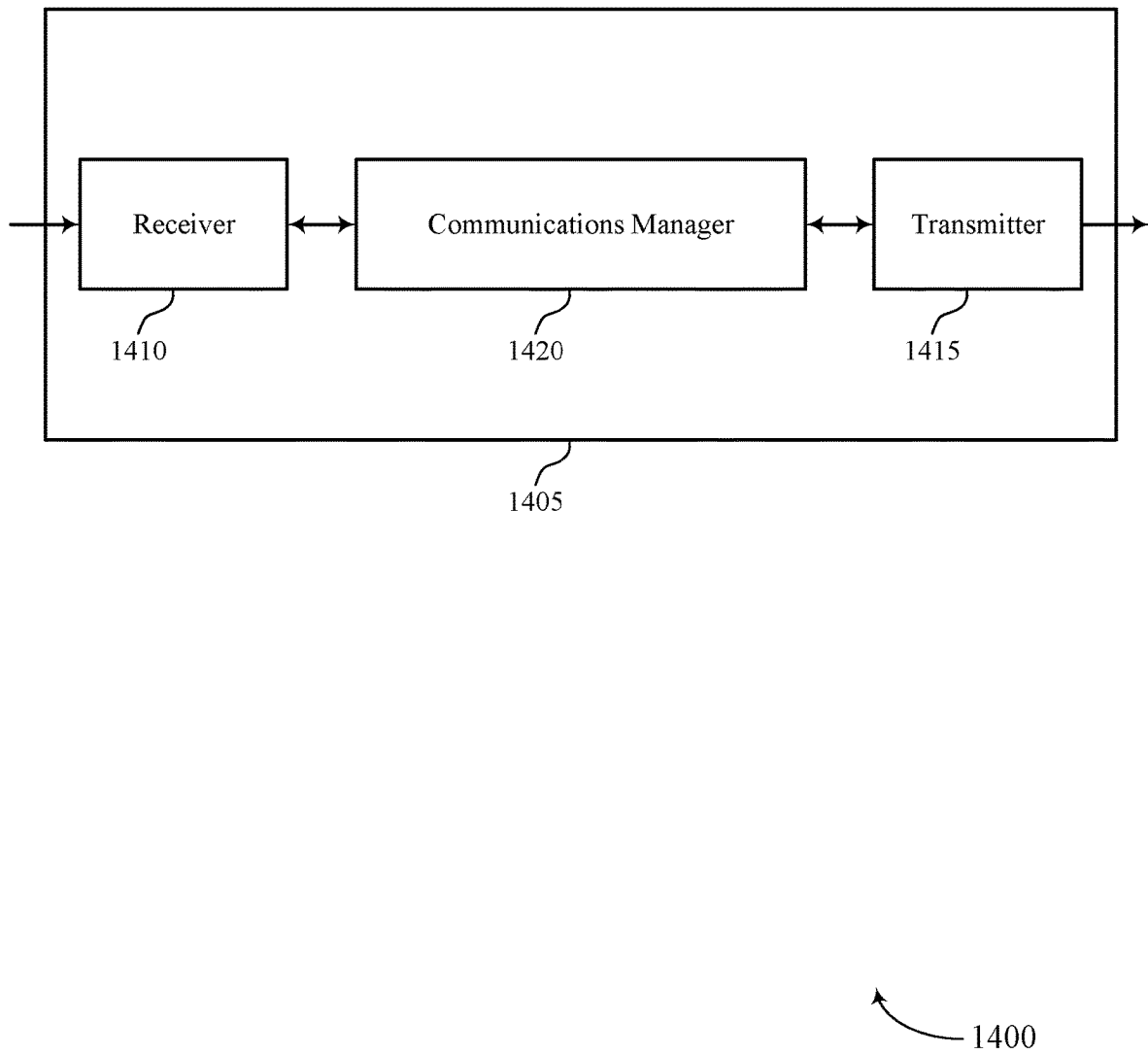
FIGS. 14 and 15 show block diagrams of devices that support beam measurement on sidelink in accordance with aspects of the present disclosure.

FIG. 14 shows a block diagram 1400 of a device 1405 that supports beam measurement on sidelink in accordance with aspects of the present disclosure. The device 1405 may be an example of aspects of a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to beam measurement on sidelink). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to beam measurement on sidelink). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of beam measurement on sidelink as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a UE in accordance with examples as disclosed herein. For example, the communications manager 1420 may be configured as or otherwise support a means for transmitting or receiving control signaling indicating a sidelink beam sweep configuration and a first wake-up signal resource. The communications manager 1420 may be configured as or otherwise support a means for receiving, during the first wake-up signal resource, a wake-up signal that triggers an active duration of a discontinuous reception cycle. The communications manager 1420 may be configured as or otherwise support a means for performing a sidelink beam sweep procedure based on the sidelink beam sweep configuration. The communications manager 1420 may be configured as or otherwise support a means for communicating, during the active duration using a first receive beam or a first transmit beam selected in the sidelink beam sweep procedure, a data message, a control message, or both.

Additionally, or alternatively, the communications manager 1420 may support wireless communications at a first UE in accordance with examples as disclosed herein. For example, the communications manager 1420 may be configured as or otherwise support a means for transmitting a control message indicating that the first UE is or is not capable of performing a sidelink beam sweep procedure outside of an active duration of a discontinuous reception cycle of the first UE. The communications manager 1420 may be configured as or otherwise support a means for receiving, based on the control message, control signaling indicating a sidelink beam sweep configuration that identifies a set of multiple beam measurement occasions. The communications manager 1420 may be configured as or otherwise support a means for performing, during a first beam measurement occasion of the set of multiple beam measurement occasions, the sidelink beam sweep procedure based on the sidelink beam sweep configuration. The communications manager 1420 may be configured as or otherwise support a means for transmitting, to a second UE, a beam measurement report indicating at least one transmit beam of a set of multiple transmit beams of the sidelink beam sweep procedure, a beam measurement for the at least one transmit beam, or both.

Additionally, or alternatively, the communications manager 1420 may support wireless communications at a first UE in accordance with examples as disclosed herein. For example, the communications manager 1420 may be configured as or otherwise support a means for transmitting or receiving a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values. The communications manager 1420 may be configured as or otherwise support a means for performing the sidelink beam sweep procedure based on the set of multiple timing offset values. The communications manager 1420 may be configured as or otherwise support a means for transmitting or receiving a sidelink beam measurement report indicating at least one transmit beam of the set of multiple transmit beams, a beam measurement for the at least one transmit beam, or both, based on the sidelink beam sweep procedure.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for beam measurements during DRX cycles, resulting in increased power savings, more efficient use of computational resources, higher quality communications and less failed transmissions, extended battery life, and improved user experience.

Figure 15:
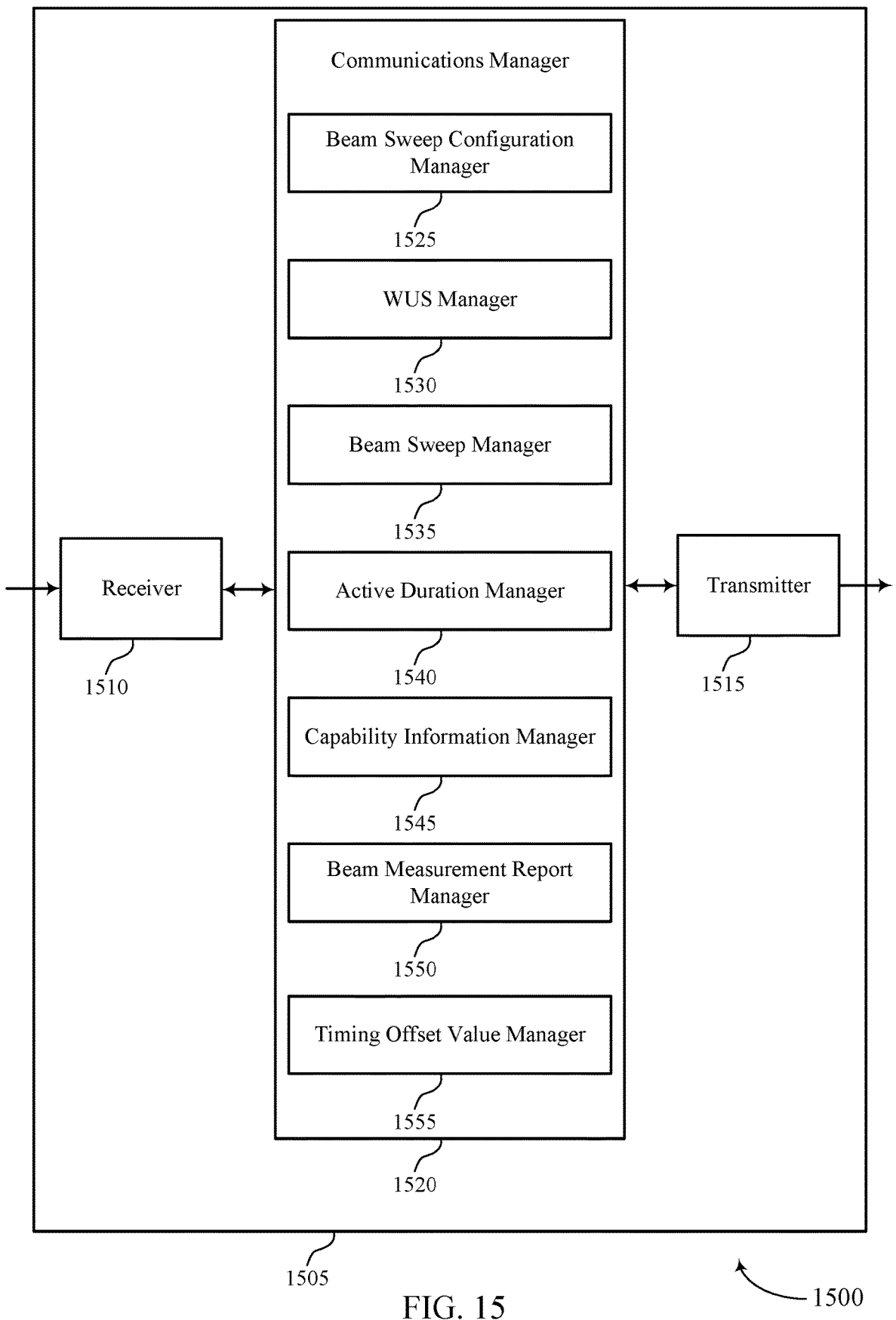

FIG. 15 shows a block diagram 1500 of a device 1505 that supports beam measurement on sidelink in accordance with aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to beam measurement on sidelink). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to beam measurement on sidelink). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of beam measurement on sidelink as described herein. For example, the communications manager 1520 may include a beam sweep configuration manager 1525, a WUS manager 1530, a beam sweep manager 1535, an active duration manager 1540, a capability information manager 1545, a beam measurement report manager 1550, a timing offset value manager 1555, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a UE in accordance with examples as disclosed herein. The beam sweep configuration manager 1525 may be configured as or otherwise support a means for transmitting or receiving control signaling indicating a sidelink beam sweep configuration and a first wake-up signal resource. The WUS manager 1530 may be configured as or otherwise support a means for receiving, during the first wake-up signal resource, a wake-up signal that triggers an active duration of a discontinuous reception cycle. The beam sweep manager 1535 may be configured as or otherwise support a means for performing a sidelink beam sweep procedure based on the sidelink beam sweep configuration. The active duration manager 1540 may be configured as or otherwise support a means for communicating, during the active duration using a first receive beam or a first transmit beam selected in the sidelink beam sweep procedure, a data message, a control message, or both.

Additionally, or alternatively, the communications manager 1520 may support wireless communications at a first UE in accordance with examples as disclosed herein. The capability information manager 1545 may be configured as or otherwise support a means for transmitting a control message indicating that the first UE is or is not capable of performing a sidelink beam sweep procedure outside of an active duration of a discontinuous reception cycle of the first UE. The beam sweep configuration manager 1525 may be configured as or otherwise support a means for receiving, based on the control message, control signaling indicating a sidelink beam sweep configuration that identifies a set of multiple beam measurement occasions. The beam sweep manager 1535 may be configured as or otherwise support a means for performing, during a first beam measurement occasion of the set of multiple beam measurement occasions, the sidelink beam sweep procedure based on the sidelink beam sweep configuration. The beam measurement report manager 1550 may be configured as or otherwise support a means for transmitting, to a second UE, a beam measurement report indicating at least one transmit beam of a set of multiple transmit beams of the sidelink beam sweep procedure, a beam measurement for the at least one transmit beam, or both.

Additionally, or alternatively, the communications manager 1520 may support wireless communications at a first UE in accordance with examples as disclosed herein. The timing offset value manager 1555 may be configured as or otherwise support a means for transmitting or receiving a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values. The beam sweep manager 1535 may be configured as or otherwise support a means for performing the sidelink beam sweep procedure based on the set of multiple timing offset values. The beam measurement report manager 1550 may be configured as or otherwise support a means for transmitting or receiving a sidelink beam measurement report indicating at least one transmit beam of the set of multiple transmit beams, a beam measurement for the at least one transmit beam, or both, based on the sidelink beam sweep procedure.

Figure 16:
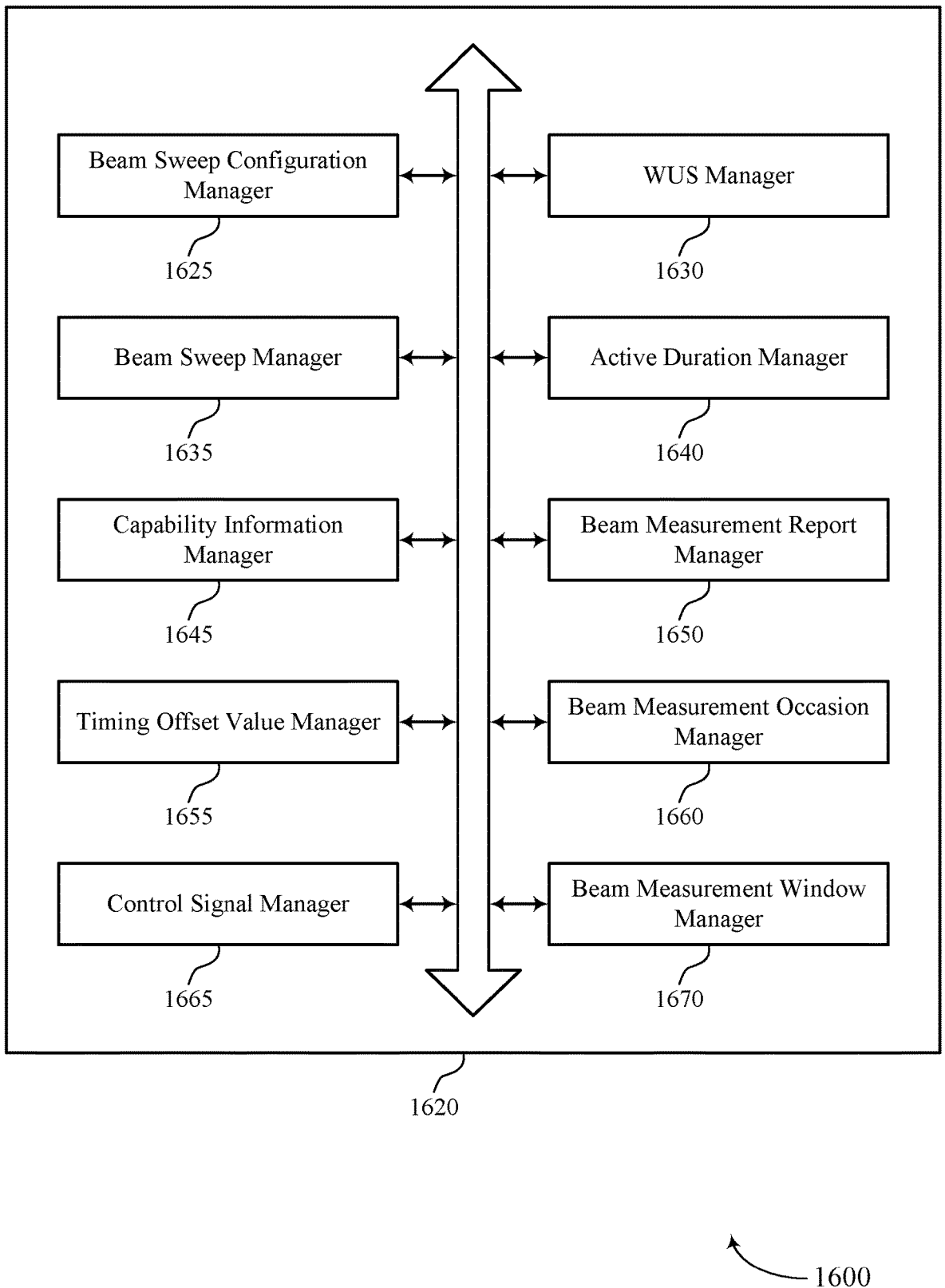
FIG. 16 shows a block diagram of a communications manager that supports beam measurement on sidelink in accordance with aspects of the present disclosure.

FIG. 16 shows a block diagram 1600 of a communications manager 1620 that supports beam measurement on sidelink in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of beam measurement on sidelink as described herein. For example, the communications manager 1620 may include a beam sweep configuration manager 1625, a WUS manager 1630, a beam sweep manager 1635, an active duration manager 1640, a capability information manager 1645, a beam measurement report manager 1650, a timing offset value manager 1655, a beam measurement occasion manager 1660, a control signal manager 1665, a beam measurement window manager 1670, or any combination thereof. Each of these components may communicate, directly or indirectly, with one another (e.g., via one or more buses).

The communications manager 1620 may support wireless communications at a UE in accordance with examples as disclosed herein. The beam sweep configuration manager 1625 may be configured as or otherwise support a means for transmitting or receiving control signaling indicating a sidelink beam sweep configuration and a first wake-up signal resource. The WUS manager 1630 may be configured as or otherwise support a means for receiving, during the first wake-up signal resource, a wake-up signal that triggers an active duration of a discontinuous reception cycle. The beam sweep manager 1635 may be configured as or otherwise support a means for performing a sidelink beam sweep procedure based on the sidelink beam sweep configuration. The active duration manager 1640 may be configured as or otherwise support a means for communicating, during the active duration using a first receive beam or a first transmit beam selected in the sidelink beam sweep procedure, a data message, a control message, or both.

In some examples, to support performing the sidelink beam sweep procedure, the beam measurement occasion manager 1660 may be configured as or otherwise support a means for performing the sidelink beam sweep procedure during a beam measurement occasion that occurs after the first wake-up signal resource and prior to the active duration.

In some examples, to support receiving the wake-up signal, the WUS manager 1630 may be configured as or otherwise support a means for receiving the wake-up signal that triggers the first UE to perform the sidelink beam sweep procedure during the beam measurement occasion.

In some examples, the WUS manager 1630 may be configured as or otherwise support a means for receiving a second wake-up signal that triggers a second active duration of the discontinuous reception cycle. In some examples, the WUS manager 1630 may be configured as or otherwise support a means for communicating, during the second active duration using the first receive beam or the first transmit beam selected in the sidelink beam sweep procedure, a second data message, a second control message, or both.

In some examples, to support performing the sidelink beam sweep procedure, the beam sweep manager 1635 may be configured as or otherwise support a means for performing the sidelink beam sweep procedure during a beam measurement occasion that occurs prior to the first wake-up signal resource and prior to the active duration.

In some examples, to support performing the sidelink beam sweep procedure, the beam sweep manager 1635 may be configured as or otherwise support a means for performing the sidelink beam sweep procedure during the first wake-up signal resource.

In some examples, to support receiving the wake-up signal, the WUS manager 1630 may be configured as or otherwise support a means for receiving the wake-up signal that triggers the first UE to perform the sidelink beam sweep procedure during the first wake-up signal resource.

In some examples, the beam measurement report manager 1650 may be configured as or otherwise support a means for transmitting, to a second UE, a beam measurement report indicating the first transmit beam, the first receive beam, or both, where communicating during the active duration using the first receive beam or the first transmit beam that is selected is based on the beam measurement report.

In some examples, the beam measurement report manager 1650 may be configured as or otherwise support a means for transmitting, to a second UE, a beam measurement report indicating a beam measurement based on the sidelink beam sweep procedure, where communicating during the active duration using the first receive beam or the first transmit beam that is selected is based on the beam measurement report.

Additionally, or alternatively, the communications manager 1620 may support wireless communications at a first UE in accordance with examples as disclosed herein. The capability information manager 1645 may be configured as or otherwise support a means for transmitting a control message indicating that the first UE is or is not capable of performing a sidelink beam sweep procedure outside of an active duration of a discontinuous reception cycle of the first UE. In some examples, the beam sweep configuration manager 1625 may be configured as or otherwise support a means for receiving, based on the control message, control signaling indicating a sidelink beam sweep configuration that identifies a set of multiple beam measurement occasions. In some examples, the beam sweep manager 1635 may be configured as or otherwise support a means for performing, during a first beam measurement occasion of the set of multiple beam measurement occasions, the sidelink beam sweep procedure based on the sidelink beam sweep configuration. The beam measurement report manager 1650 may be configured as or otherwise support a means for transmitting, to a second UE, a beam measurement report indicating at least one transmit beam of a set of multiple transmit beams of the sidelink beam sweep procedure, a beam measurement for the at least one transmit beam, or both.

In some examples, to support performing the sidelink beam sweep procedure, the beam sweep manager 1635 may be configured as or otherwise support a means for performing the sidelink beam sweep procedure during the first beam measurement occasion that occurs within the active duration of the discontinuous reception cycle of the first UE based on the control message indicating that the first UE is not capable of performing the sidelink beam sweep procedure outside of the active duration of the discontinuous reception cycle.

In some examples, the capability information manager 1645 may be configured as or otherwise support a means for refraining from performing a second sidelink beam sweep procedure during a second beam measurement occasion that occurs outside of the active duration of the discontinuous reception cycle of the UE based on the control message indicating that the first UE is not capable of performing the sidelink beam sweep procedure outside of the active duration of the discontinuous reception cycle.

In some examples, to support performing the sidelink beam sweep procedure, the beam sweep manager 1635 may be configured as or otherwise support a means for performing the sidelink beam sweep procedure during the first beam measurement occasion that occurs outside of the active duration of the discontinuous reception cycle of the first UE based on the control message indicating that the first UE is capable of performing the sidelink beam sweep procedure outside of the active duration of the discontinuous reception cycle.

In some examples, the active duration manager 1640 may be configured as or otherwise support a means for communicating, during the active duration using the at least one transmit beam of the set of multiple transmit beams selected in the sidelink beam sweep procedure, a data message, a control message, or both.

In some examples, to support receiving the control signaling, the control signal manager 1665 may be configured as or otherwise support a means for receiving layer one signaling, layer two signaling, or layer three signaling that indicates the sidelink beam sweep configuration.

In some examples, the control signal manager 1665 may be configured as or otherwise support a means for receiving second control signaling that is layer one signaling, layer two signaling, or layer three signaling that indicates an updated sidelink beam sweep configuration that identifies a second set of multiple beam measurement occasions.

Additionally, or alternatively, the communications manager 1620 may support wireless communications at a first UE in accordance with examples as disclosed herein. The timing offset value manager 1655 may be configured as or otherwise support a means for transmitting or receiving a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values. In some examples, the beam sweep manager 1635 may be configured as or otherwise support a means for performing the sidelink beam sweep procedure based on the set of multiple timing offset values. In some examples, the beam measurement report manager 1650 may be configured as or otherwise support a means for transmitting or receiving a sidelink beam measurement report indicating at least one transmit beam of the set of multiple transmit beams, a beam measurement for the at least one transmit beam, or both, based on the sidelink beam sweep procedure.

In some examples, to support transmitting or receiving the control message, the timing offset value manager 1655 may be configured as or otherwise support a means for transmitting or receiving the control message indicating the set of multiple timing offset values that respectively correspond to a set of multiple transmit beam occasions that each occur within the active duration of the discontinuous reception cycle.

In some examples, to support transmitting or receiving the control message, the timing offset value manager 1655 may be configured as or otherwise support a means for transmitting or receiving the control message indicating the set of multiple timing offset values that respectively correspond to a set of multiple transmit beam occasions that each occur prior to a beginning of the active duration of the discontinuous reception cycle.

In some examples, the beam measurement window manager 1670 may be configured as or otherwise support a means for transmitting or receiving an indication of a beam measurement window defining a time period prior to the beginning of the active duration of the discontinuous reception cycle.

In some examples, the timing offset value manager 1655 may be configured as or otherwise support a means for performing the sidelink beam sweep procedure within the beam measurement window where each of the set of multiple transmit beam occasions corresponds to a respective timing offset value of the set of multiple timing offset values within the beam measurement window.

In some examples, the control signal manager 1665 may be configured as or otherwise support a means for receiving the control message or a second control message that triggers the first UE to perform the sidelink beam sweep procedure in a resource of a sidelink channel.

In some examples, the beam sweep configuration manager 1625 may be configured as or otherwise support a means for communicating, using a transmit beam or a receive beam selected in the sidelink beam sweep procedure, a data message, a control message, or both.

Figure 17:
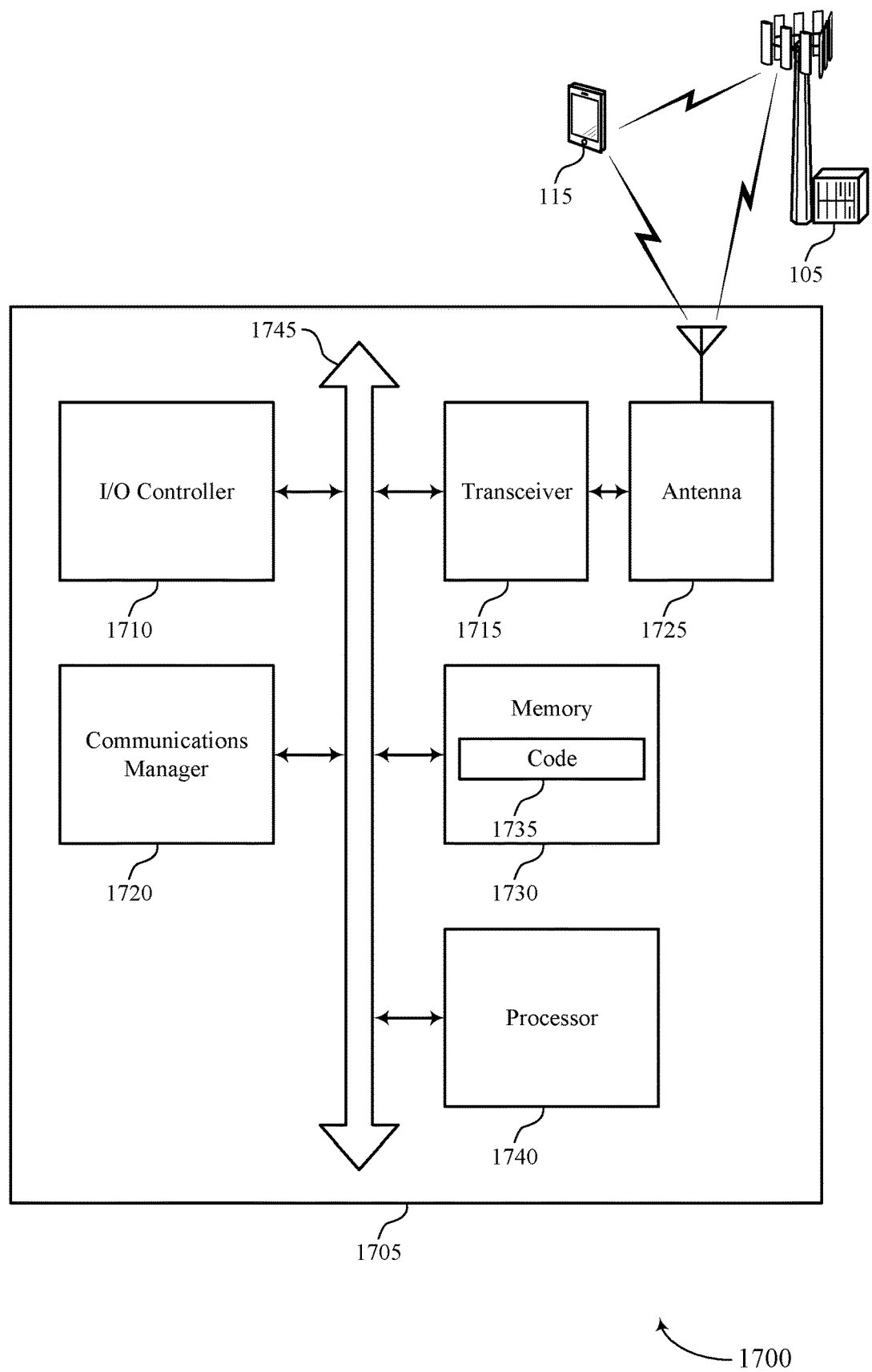
FIG. 17 shows a diagram of a system including a device that supports beam measurement on sidelink in accordance with aspects of the present disclosure.

FIG. 17 shows a diagram of a system 1700 including a device 1705 that supports beam measurement on sidelink in accordance with aspects of the present disclosure. The device 1705 may be an example of or include the components of a device 1405, a device 1505, or a UE 115 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting beam measurement on sidelink). For example, the device 1705 or a component of the device 1705 may include a processor 1740 and memory 1730 coupled to the processor 1740, the processor 1740 and memory 1730 configured to perform various functions described herein.

The communications manager 1720 may support wireless communications at a UE in accordance with examples as disclosed herein. For example, the communications manager 1720 may be configured as or otherwise support a means for transmitting or receiving control signaling indicating a sidelink beam sweep configuration and a first wake-up signal resource. The communications manager 1720 may be configured as or otherwise support a means for receiving, during the first wake-up signal resource, a wake-up signal that triggers an active duration of a discontinuous reception cycle. The communications manager 1720 may be configured as or otherwise support a means for performing a sidelink beam sweep procedure based on the sidelink beam sweep configuration. The communications manager 1720 may be configured as or otherwise support a means for communicating, during the active duration using a first receive beam or a first transmit beam selected in the sidelink beam sweep procedure, a data message, a control message, or both.

Additionally, or alternatively, the communications manager 1720 may support wireless communications at a first UE in accordance with examples as disclosed herein. For example, the communications manager 1720 may be configured as or otherwise support a means for transmitting a control message indicating that the first UE is or is not capable of performing a sidelink beam sweep procedure outside of an active duration of a discontinuous reception cycle of the first UE. The communications manager 1720 may be configured as or otherwise support a means for receiving, based on the control message, control signaling indicating a sidelink beam sweep configuration that identifies a set of multiple beam measurement occasions. The communications manager 1720 may be configured as or otherwise support a means for performing, during a first beam measurement occasion of the set of multiple beam measurement occasions, the sidelink beam sweep procedure based on the sidelink beam sweep configuration. The communications manager 1720 may be configured as or otherwise support a means for transmitting, to a second UE, a beam measurement report indicating at least one transmit beam of a set of multiple transmit beams of the sidelink beam sweep procedure, a beam measurement for the at least one transmit beam, or both.

Additionally, or alternatively, the communications manager 1720 may support wireless communications at a first UE in accordance with examples as disclosed herein. For example, the communications manager 1720 may be configured as or otherwise support a means for transmitting or receiving a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values. The communications manager 1720 may be configured as or otherwise support a means for performing the sidelink beam sweep procedure based on the set of multiple timing offset values. The communications manager 1720 may be configured as or otherwise support a means for transmitting or receiving a sidelink beam measurement report indicating at least one transmit beam of the set of multiple transmit beams, a beam measurement for the at least one transmit beam, or both, based on the sidelink beam sweep procedure.

By including or configuring the communications manager 1720 in accordance with examples as described herein, the device 1705 may support techniques for beam measurements during DRX cycles, resulting in increased power savings, more efficient use of computational resources, higher quality communications and less failed transmissions, extended battery life, and improved user experience.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of beam measurement on sidelink as described herein, or the processor 1740 and the memory 1730 may be otherwise configured to perform or support such operations.

Figure 18:
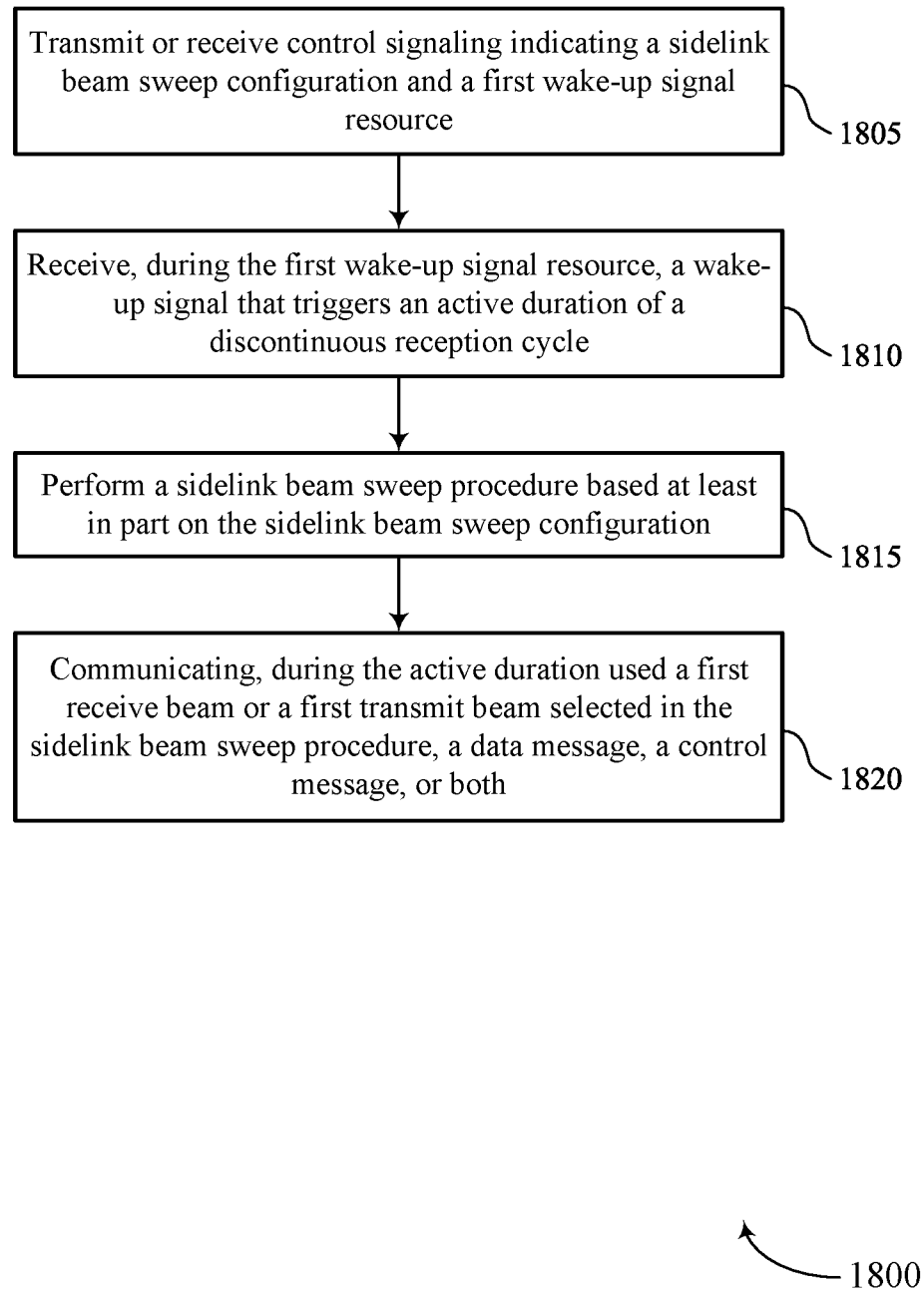
FIGS. 18 through 20 show flowcharts illustrating methods that support beam measurement on sidelink in accordance with aspects of the present disclosure.

FIG. 18 shows a flowchart illustrating a method 1800 that supports beam measurement on sidelink in accordance with aspects of the present disclosure. The operations of the method 1800 may be implemented by a UE or its components as described herein. For example, the operations of the method 1800 may be performed by a UE 115 as described with reference to FIGS. 1 through 17. In some examples, a UE may execute a set of instructions to control the functional elements of the UE to perform the described functions. Additionally, or alternatively, the UE may perform aspects of the described functions using special-purpose hardware.

At 1805, the method may include transmitting or receiving control signaling indicating a sidelink beam sweep configuration and a first wake-up signal resource. The operations of 1805 may be performed in accordance with examples as disclosed herein. In some examples, aspects of the operations of 1805 may be performed by a beam sweep configuration manager 1625 as described with reference to FIG. 16.

At 1810, the method may include receiving, during the first wake-up signal resource, a wake-up signal that triggers an active duration of a discontinuous reception cycle. The operations of 1810 may be performed in accordance with examples as disclosed herein. In some examples, aspects of the operations of 1810 may be performed by a WUS manager 1630 as described with reference to FIG. 16.

At 1815, the method may include performing a sidelink beam sweep procedure based on the sidelink beam sweep configuration. The operations of 1815 may be performed in accordance with examples as disclosed herein. In some examples, aspects of the operations of 1815 may be performed by a beam sweep manager 1635 as described with reference to FIG. 16.

At 1820, the method may include communicating, during the active duration using a first receive beam or a first transmit beam selected in the sidelink beam sweep procedure, a data message, a control message, or both. The operations of 1820 may be performed in accordance with examples as disclosed herein. In some examples, aspects of the operations of 1820 may be performed by an active duration manager 1640 as described with reference to FIG. 16.

Figure 19:
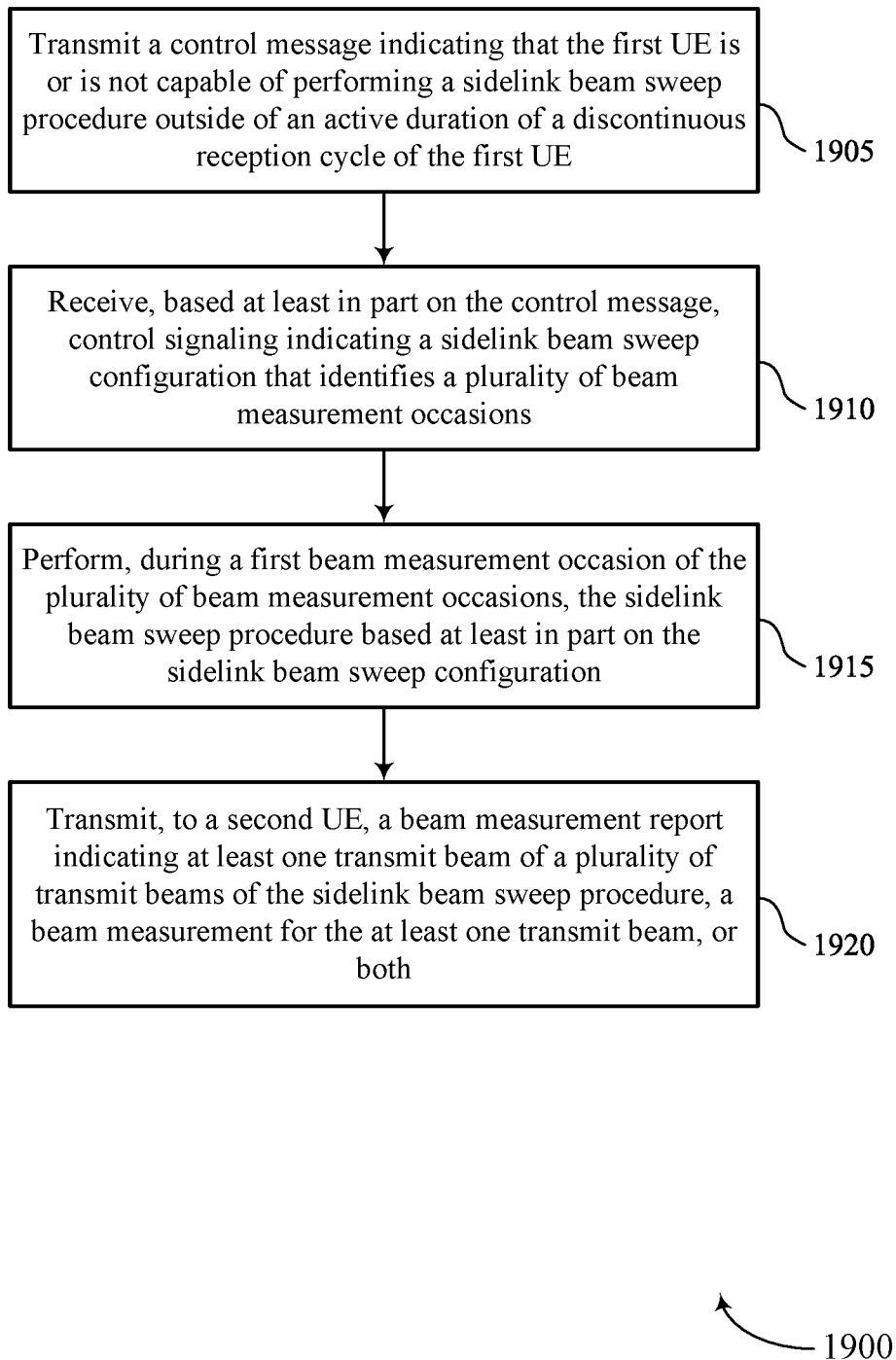

FIG. 19 shows a flowchart illustrating a method 1900 that supports beam measurement on sidelink in accordance with aspects of the present disclosure. The operations of the method 1900 may be implemented by a UE or its components as described herein. For example, the operations of the method 1900 may be performed by a UE 115 as described with reference to FIGS. 1 through 17. In some examples, a UE may execute a set of instructions to control the functional elements of the UE to perform the described functions. Additionally, or alternatively, the UE may perform aspects of the described functions using special-purpose hardware.

At 1905, the method may include transmitting a control message indicating that the first UE is or is not capable of performing a sidelink beam sweep procedure outside of an active duration of a discontinuous reception cycle of the first UE. The operations of 1905 may be performed in accordance with examples as disclosed herein. In some examples, aspects of the operations of 1905 may be performed by a capability information manager 1645 as described with reference to FIG. 16.

At 1910, the method may include receiving, based on the control message, control signaling indicating a sidelink beam sweep configuration that identifies a set of multiple beam measurement occasions. The operations of 1910 may be performed in accordance with examples as disclosed herein. In some examples, aspects of the operations of 1910 may be performed by a beam sweep configuration manager 1625 as described with reference to FIG. 16.

At 1915, the method may include performing, during a first beam measurement occasion of the set of multiple beam measurement occasions, the sidelink beam sweep procedure based on the sidelink beam sweep configuration. The operations of 1915 may be performed in accordance with examples as disclosed herein. In some examples, aspects of the operations of 1915 may be performed by a beam sweep manager 1635 as described with reference to FIG. 16.

At 1920, the method may include transmitting, to a second UE, a beam measurement report indicating at least one transmit beam of a set of multiple transmit beams of the sidelink beam sweep procedure, a beam measurement for the at least one transmit beam, or both. The operations of 1920 may be performed in accordance with examples as disclosed herein. In some examples, aspects of the operations of 1920 may be performed by a beam measurement report manager 1650 as described with reference to FIG. 16.

Figure 20:
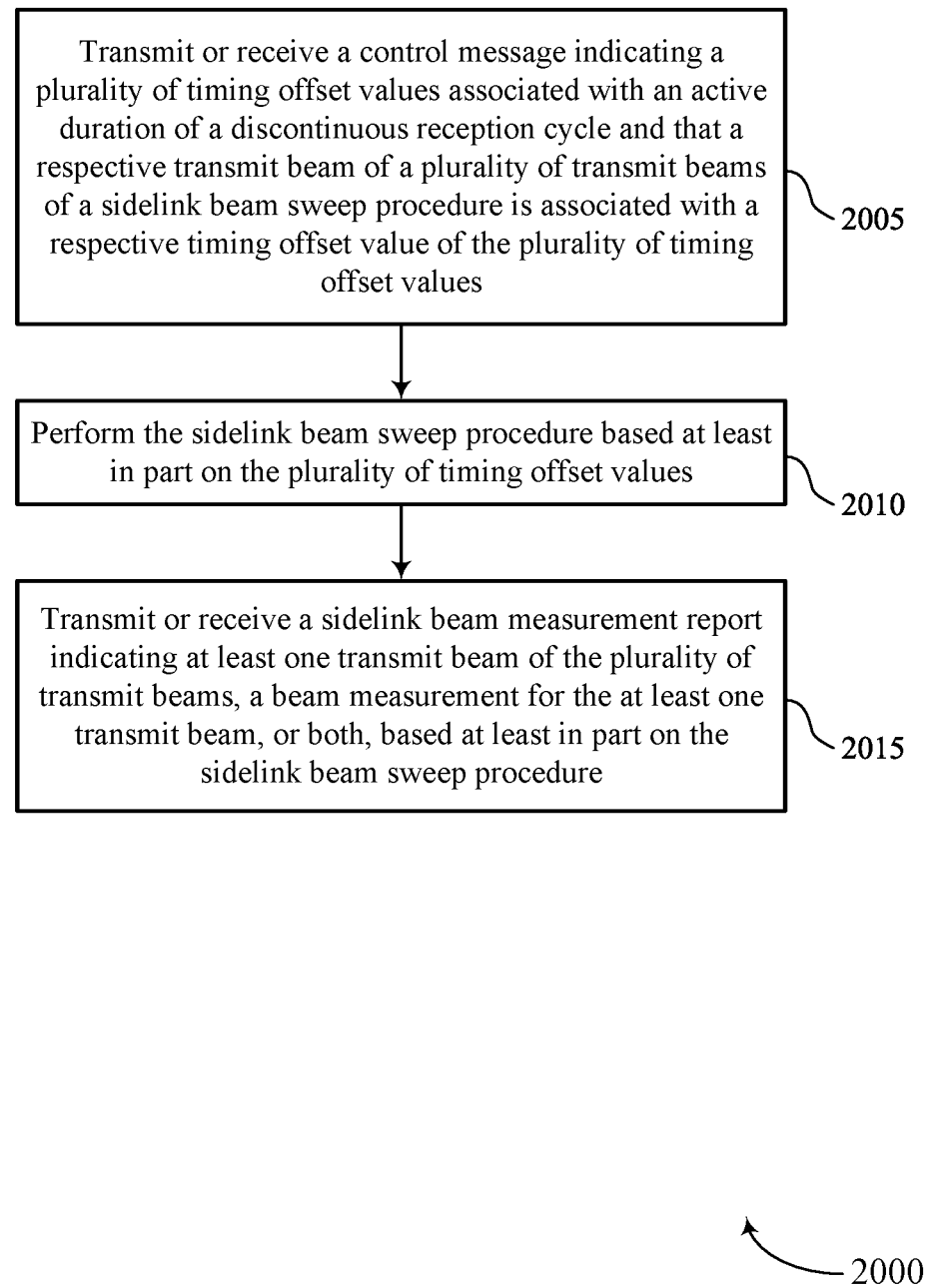

FIG. 20 shows a flowchart illustrating a method 2000 that supports beam measurement on sidelink in accordance with aspects of the present disclosure. The operations of the method 2000 may be implemented by a UE or its components as described herein. For example, the operations of the method 2000 may be performed by a UE 115 as described with reference to FIGS. 1 through 17. In some examples, a UE may execute a set of instructions to control the functional elements of the UE to perform the described functions. Additionally, or alternatively, the UE may perform aspects of the described functions using special-purpose hardware.

At 2005, the method may include transmitting or receiving a control message indicating a set of multiple timing offset values associated with an active duration of a discontinuous reception cycle and that a respective transmit beam of a set of multiple transmit beams of a sidelink beam sweep procedure is associated with a respective timing offset value of the set of multiple timing offset values. The operations of 2005 may be performed in accordance with examples as disclosed herein. In some examples, aspects of the operations of 2005 may be performed by a timing offset value manager 1655 as described with reference to FIG. 16.

At 2010, the method may include performing the sidelink beam sweep procedure based on the set of multiple timing offset values. The operations of 2010 may be performed in accordance with examples as disclosed herein. In some examples, aspects of the operations of 2010 may be performed by a beam sweep manager 1635 as described with reference to FIG. 16.

At 2015, the method may include transmitting or receiving a sidelink beam measurement report indicating at least one transmit beam of the set of multiple transmit beams, a beam measurement for the at least one transmit beam, or both, based on the sidelink beam sweep procedure. The operations of 2015 may be performed in accordance with examples as disclosed herein. In some examples, aspects of the operations of 2015 may be performed by a beam measurement report manager 1650 as described with reference to FIG. 16.

The following provides an overview of aspects of the present disclosure:

Aspect 1: A method for wireless communications at a UE, comprising: transmitting or receiving control signaling indicating a sidelink beam sweep configuration and a first wake-up signal resource; receiving, during the first wake-up signal resource, a wake-up signal that triggers an active duration of a discontinuous reception cycle; performing a sidelink beam sweep procedure based at least in part on the sidelink beam sweep configuration; and communicating, during the active duration using a first receive beam or a first transmit beam selected in the sidelink beam sweep procedure, a data message, a control message, or both.

Aspect 2: The method of aspect 1, wherein performing the sidelink beam sweep procedure comprises: performing the sidelink beam sweep procedure during a beam measurement occasion that occurs after the first wake-up signal resource and prior to the active duration.

Aspect 3: The method of aspect 2, wherein receiving the wake-up signal comprises: receiving the wake-up signal that triggers the UE to perform the sidelink beam sweep procedure during the beam measurement occasion.

Aspect 4: The method of any of aspects 2 through 3, further comprising: receiving a second wake-up signal that triggers a second active duration of the discontinuous reception cycle; and communicating, during the second active duration using the first receive beam or the first transmit beam selected in the sidelink beam sweep procedure, a second data message, a second control message, or both.

Aspect 5: The method of any of aspects 1 through 4, wherein performing the sidelink beam sweep procedure comprises: performing the sidelink beam sweep procedure during a beam measurement occasion that occurs prior to the first wake-up signal resource and prior to the active duration.

Aspect 6: The method of any of aspects 1 through 5, wherein performing the sidelink beam sweep procedure comprises: performing the sidelink beam sweep procedure during the first wake-up signal resource.

Aspect 7: The method of aspect 6, wherein receiving the wake-up signal comprises: receiving the wake-up signal that triggers the UE to perform the sidelink beam sweep procedure during the first wake-up signal resource.

Aspect 8: The method of any of aspects 1 through 7, further comprising: transmitting, to a second UE, a beam measurement report indicating the first transmit beam, the first receive beam, or both, wherein communicating during the active duration using the first receive beam or the first transmit beam that is selected is based at least in part on the beam measurement report.

Aspect 9: The method of any of aspects 1 through 8, further comprising: transmitting, to a second UE, a beam measurement report indicating a beam measurement based at least in part on the sidelink beam sweep procedure, wherein communicating during the active duration using the first receive beam or the first transmit beam that is selected is based at least in part on the beam measurement report.

Aspect 10: A method for wireless communications at a first UE, comprising: transmitting a control message indicating that the first UE is or is not capable of performing a sidelink beam sweep procedure outside of an active duration of a discontinuous reception cycle of the first UE; receiving, based at least in part on the control message, control signaling indicating a sidelink beam sweep configuration that identifies a plurality of beam measurement occasions; performing, during a first beam measurement occasion of the plurality of beam measurement occasions, the sidelink beam sweep procedure based at least in part on the sidelink beam sweep configuration; and transmitting, to a second UE, a beam measurement report indicating at least one transmit beam of a plurality of transmit beams of the sidelink beam sweep procedure, a beam measurement for the at least one transmit beam, or both.

Aspect 11: The method of aspect 10, wherein performing the sidelink beam sweep procedure comprises: performing the sidelink beam sweep procedure during the first beam measurement occasion that occurs within the active duration of the discontinuous reception cycle of the first UE based at least in part on the control message indicating that the UE is not capable of performing the sidelink beam sweep procedure outside of the active duration of the discontinuous reception cycle.

Aspect 12: The method of aspect 11, further comprising: refraining from performing a second sidelink beam sweep procedure during a second beam management occasion that occurs outside of the active duration of the discontinuous reception cycle of the UE based at least in part on the control message indicating that the UE is not capable of performing the sidelink beam sweep procedure outside of the active duration of the discontinuous reception cycle.

Aspect 13: The method of any of aspects 10 through 12, wherein performing the sidelink beam sweep procedure comprises: performing the sidelink beam sweep procedure during the first beam measurement occasion that occurs outside of the active duration of the discontinuous reception cycle of the UE based at least in part on the control message indicating that the UE is capable of performing the sidelink beam sweep procedure outside of the active duration of the discontinuous reception cycle.

Aspect 14: The method of any of aspects 10 through 13, further comprising: communicating, during the active duration using the at least one transmit beam of the plurality of transmit beams selected in the sidelink beam sweep procedure, a data message, a control message, or both.

Aspect 15: The method of any of aspects 10 through 14, wherein receiving the control signaling comprises: receiving layer one signaling, layer two signaling, or layer three signaling that indicates the sidelink beam sweep configuration.

Aspect 16: The method of any of aspects 10 through 15, further comprising: receiving second control signaling that is layer one signaling, layer two signaling, or layer three signaling that indicates an updated sidelink beam sweep configuration that identifies a second plurality of beam measurement occasions.

Aspect 17: A method for wireless communications at a first UE, comprising: transmitting or receiving a control message indicating a plurality of timing offset values associated with an active duration of a discontinuous reception cycle and that a respective transmit beam of a plurality of transmit beams of a sidelink beam sweep procedure is associated with a respective timing offset value of the plurality of timing offset values; performing the sidelink beam sweep procedure based at least in part on the plurality of timing offset values; and transmitting or receiving a sidelink beam measurement report indicating at least one transmit beam of the plurality of transmit beams, a beam measurement for the at least one transmit beam, or both, based at least in part on the sidelink beam sweep procedure.

Aspect 18: The method of aspect 17, wherein transmitting or receiving the control message comprises: transmitting or receiving the control message indicating the plurality of timing offset values that respectively correspond to a plurality of transmit beam occasions that each occur within the active duration of the discontinuous reception cycle.

Aspect 19: The method of any of aspects 17 through 18, wherein transmitting or receiving the control message comprises: transmitting or receiving the control message indicating the plurality of timing offset values that respectively correspond to a plurality of transmit beam occasions that each occur prior to a beginning of the active duration of the discontinuous reception cycle.

Aspect 20: The method of aspect 19, further comprising: transmitting or receiving an indication of a beam measurement window defining a time period prior to the beginning of the active duration of the discontinuous reception cycle.

Aspect 21: The method of aspect 20, further comprising: performing the sidelink beam sweep procedure within the beam measurement window where each of the plurality of transmit beam occasions corresponds to a respective timing offset value of the plurality of timing offset values within the beam measurement window.

Aspect 22: The method of any of aspects 17 through 21, further comprising: receiving the control message or a second control message that triggers the UE to perform the sidelink beam sweep procedure in a resource of a sidelink channel.

Aspect 23: The method of any of aspects 17 through 22, further comprising: communicating, using a transmit beam or a receive beam selected in the sidelink beam sweep procedure, a data message, a control message, or both.

Aspect 24: An apparatus for wireless communications at a UE, comprising a processor; memory coupled with the processor; and instructions stored in the memory and executable by the processor to cause the apparatus to perform a method of any of aspects 1 through 9.

Aspect 25: An apparatus for wireless communications at a UE, comprising at least one means for performing a method of any of aspects 1 through 9.

Aspect 26: A non-transitory computer-readable medium storing code for wireless communications at a UE, the code comprising instructions executable by a processor to perform a method of any of aspects 1 through 9.

Aspect 27: An apparatus for wireless communications at a first UE, comprising a processor; memory coupled with the processor; and instructions stored in the memory and executable by the processor to cause the apparatus to perform a method of any of aspects 10 through 16.

Aspect 28: An apparatus for wireless communications at a first UE, comprising at least one means for performing a method of any of aspects 10 through 16.

Aspect 29: A non-transitory computer-readable medium storing code for wireless communications at a first UE, the code comprising instructions executable by a processor to perform a method of any of aspects 10 through 16.

Aspect 30: An apparatus for wireless communications at a first UE, comprising a processor; memory coupled with the processor; and instructions stored in the memory and executable by the processor to cause the apparatus to perform a method of any of aspects 17 through 23.

Aspect 31: An apparatus for wireless communications at a first UE, comprising at least one means for performing a method of any of aspects 17 through 23.

Aspect 32: A non-transitory computer-readable medium storing code for wireless communications at a first UE, the code comprising instructions executable by a processor to perform a method of any of aspects 17 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   transmitting or receiving control signaling indicating a sidelink beam sweep configuration and a first wake-up signal resource;
   receiving, during the first wake-up signal resource, a wake-up signal that triggers an active duration of a discontinuous reception cycle;
   performing a sidelink beam sweep procedure based at least in part on the sidelink beam sweep configuration, wherein the sidelink beam sweep procedure comprises sweeping through one or more beams while communicating reference signals and performing one or more beam measurements associated with the one or more beams; and
   communicating, during the active duration using a first receive beam or a first transmit beam selected in the sidelink beam sweep procedure, a data message, a control message, or both.

2. The method of claim 1, wherein performing the sidelink beam sweep procedure comprises:
   performing the sidelink beam sweep procedure during a beam measurement occasion that occurs after the first wake-up signal resource and prior to the active duration.

3. The method of claim 2, wherein receiving the wake-up signal comprises:

receiving the wake-up signal that triggers the first UE to perform the sidelink beam sweep procedure during the beam measurement occasion.

4. The method of claim 2, further comprising:
receiving a second wake-up signal that triggers a second active duration of the discontinuous reception cycle; and
communicating, during the second active duration using the first receive beam or the first transmit beam selected in the sidelink beam sweep procedure, a second data message, a second control message, or both.

5. The method of claim 1, wherein performing the sidelink beam sweep procedure comprises:
performing the sidelink beam sweep procedure during a beam measurement occasion that occurs prior to the first wake-up signal resource and prior to the active duration.

6. The method of claim 1, wherein performing the sidelink beam sweep procedure comprises:
performing the sidelink beam sweep procedure during the first wake-up signal resource.

7. The method of claim 6, wherein receiving the wake-up signal comprises:
receiving the wake-up signal that triggers the first UE to perform the sidelink beam sweep procedure during the first wake-up signal resource.

8. The method of claim 1, further comprising:
transmitting, to a second user equipment (UE), a beam measurement report indicating the first transmit beam, the first receive beam, or both, wherein communicating during the active duration using the first receive beam or the first transmit beam that is selected is based at least in part on the beam measurement report.

9. The method of claim 1, further comprising:
transmitting, to a second user equipment (UE), a beam measurement report indicating a beam measurement of the one or more beam measurements based at least in part on the sidelink beam sweep procedure, wherein communicating during the active duration using the first receive beam or the first transmit beam that is selected is based at least in part on the beam measurement report.

10. A method for wireless communications at a first user equipment (UE), comprising:
transmitting a control message indicating that the first UE is or is not capable of performing a sidelink beam sweep procedure outside of an active duration of a discontinuous reception cycle of the first UE;
receiving, based at least in part on the control message, control signaling indicating a sidelink beam sweep configuration that identifies a plurality of beam measurement occasions;
performing, during a first beam measurement occasion of the plurality of beam measurement occasions, the sidelink beam sweep procedure based at least in part on the sidelink beam sweep configuration, wherein the sidelink beam sweep procedure comprises sweeping through one or more beams while communicating reference signals and performing one or more beam measurements associated with the one or more beams; and
transmitting, to a second UE, a beam measurement report indicating at least one transmit beam of a plurality of transmit beams of the sidelink beam sweep procedure, a beam measurement of the one or more beam measurements for the at least one transmit beam, or both.

11. The method of claim 10, wherein performing the sidelink beam sweep procedure comprises:
performing the sidelink beam sweep procedure during the first beam measurement occasion that occurs within the active duration of the discontinuous reception cycle of the first UE based at least in part on the control message indicating that the first UE is not capable of performing the sidelink beam sweep procedure outside of the active duration of the discontinuous reception cycle.

12. The method of claim 11, further comprising:
refraining from performing a second sidelink beam sweep procedure during a second beam measurement occasion that occurs outside of the active duration of the discontinuous reception cycle of the first UE based at least in part on the control message indicating that the first UE is not capable of performing the sidelink beam sweep procedure outside of the active duration of the discontinuous reception cycle.

13. The method of claim 10, wherein performing the sidelink beam sweep procedure comprises:
performing the sidelink beam sweep procedure during the first beam measurement occasion that occurs outside of the active duration of the discontinuous reception cycle of the first UE based at least in part on the control message indicating that the first UE is capable of performing the sidelink beam sweep procedure outside of the active duration of the discontinuous reception cycle.

14. The method of claim 10, further comprising:
communicating, during the active duration using the at least one transmit beam of the plurality of transmit beams selected in the sidelink beam sweep procedure, a data message, a control message, or both.

15. The method of claim 10, wherein receiving the control signaling comprises:
receiving layer one signaling, layer two signaling, or layer three signaling that indicates the sidelink beam sweep configuration.

16. The method of claim 10, further comprising:
receiving second control signaling that is layer one signaling, layer two signaling, or layer three signaling that indicates an updated sidelink beam sweep configuration that identifies a second plurality of beam measurement occasions.

17. A method for wireless communications at a first user equipment (UE), comprising:
transmitting or receiving a control message indicating a plurality of timing offset values associated with an active duration of a discontinuous reception cycle and that a respective transmit beam of a plurality of transmit beams of a sidelink beam sweep procedure is associated with a respective timing offset value of the plurality of timing offset values;
performing the sidelink beam sweep procedure based at least in part on the plurality of timing offset values, wherein the sidelink beam sweep procedure comprises sweeping through one or more beams while communicating reference signals and performing one or more beam measurements associated with the one or more beams; and
transmitting or receiving a sidelink beam measurement report indicating at least one transmit beam of the plurality of transmit beams, a beam measurement of the one or more beam measurements for the at least one transmit beam, or both, based at least in part on the sidelink beam sweep procedure.

18. The method of claim 17, wherein transmitting or receiving the control message comprises:
transmitting or receiving the control message indicating the plurality of timing offset values that respectively correspond to a plurality of transmit beam occasions that each occur within the active duration of the discontinuous reception cycle.

19. The method of claim 17, wherein transmitting or receiving the control message comprises:
transmitting or receiving the control message indicating the plurality of timing offset values that respectively correspond to a plurality of transmit beam occasions that each occur prior to a beginning of the active duration of the discontinuous reception cycle.

20. The method of claim 19, further comprising:
transmitting or receiving an indication of a beam measurement window defining a time period prior to the beginning of the active duration of the discontinuous reception cycle.

21. The method of claim 20, further comprising:
performing the sidelink beam sweep procedure within the beam measurement window where each of the plurality of transmit beam occasions corresponds to a respective timing offset value of the plurality of timing offset values within the beam measurement window.

22. The method of claim 17, further comprising:
receiving the control message or a second control message that triggers the first UE to perform the sidelink beam sweep procedure in a resource of a sidelink channel.

23. The method of claim 17, further comprising:
communicating, using a transmit beam or a receive beam selected in the sidelink beam sweep procedure, a data message, a control message, or both.

24. An apparatus for wireless communications at a first user equipment (UE), comprising:
a processor;
memory coupled with the processor; and
instructions stored in the memory and executable by the processor to cause the apparatus to:
transmit or receive control signaling indicating a sidelink beam sweep configuration and a first wake-up signal resource;
receive, during the first wake-up signal resource, a wake-up signal that triggers an active duration of a discontinuous reception cycle;
perform a sidelink beam sweep procedure based at least in part on the sidelink beam sweep configuration, wherein the sidelink beam sweep procedure comprises sweeping through one or more beams while communicating reference signals and performing one or more beam measurements associated with the one or more beams; and
communicating, during the active duration using a first receive beam or a first transmit beam selected in the sidelink beam sweep procedure, a data message, a control message, or both.

25. The apparatus of claim 24, wherein the instructions to perform the sidelink beam sweep procedure are executable by the processor to cause the apparatus to:
perform the sidelink beam sweep procedure during a beam measurement occasion that occurs after the first wake-up signal resource and prior to the active duration.

26. The apparatus of claim 25, wherein the instructions to receive the wake-up signal are executable by the processor to cause the apparatus to:
receive the wake-up signal that triggers the first UE to perform the sidelink beam sweep procedure during the beam measurement occasion.

27. The apparatus of claim 25, wherein the instructions are further executable by the processor to cause the apparatus to:
receive a second wake-up signal that triggers a second active duration of the discontinuous reception cycle; and
communicating, during the second active duration used the first receive beam or the first transmit beam selected in the sidelink beam sweep procedure, a second data message, a second control message, or both.

28. The apparatus of claim 24, wherein the instructions to perform the sidelink beam sweep procedure are executable by the processor to cause the apparatus to:
perform the sidelink beam sweep procedure during a beam measurement occasion that occurs prior to the first wake-up signal resource and prior to the active duration.

29. The apparatus of claim 24, wherein the instructions to perform the sidelink beam sweep procedure are executable by the processor to cause the apparatus to:
perform the sidelink beam sweep procedure during the first wake-up signal resource.

30. The apparatus of claim 29, wherein the instructions to receive the wake-up signal are executable by the processor to cause the apparatus to:
receive the wake-up signal that triggers the first UE to perform the sidelink beam sweep procedure during the first wake-up signal resource.

* * * * *